(12) United States Patent
Aminaka et al.

(10) Patent No.: US 10,136,301 B2
(45) Date of Patent: Nov. 20, 2018

(54) RADIO COMMUNICATION SYSTEM, BASE STATION, MOBILE STATION, COMMUNICATION CONTROL METHOD, AND NON-TRANSITORY COMPUTER READABLE MEDIUM

(71) Applicant: NEC Corporation, Tokyo (JP)

(72) Inventors: Hiroaki Aminaka, Tokyo (JP); Hisashi Futaki, Tokyo (JP)

(73) Assignee: NEC Corporation, Tokyo (JP)

( * ) Notice: Subject to any disclaimer, the term of this patent is extended or adjusted under 35 U.S.C. 154(b) by 407 days.

(21) Appl. No.: 14/758,945

(22) PCT Filed: Dec. 6, 2013

(86) PCT No.: PCT/JP2013/007176
§ 371 (c)(1),
(2) Date: Jul. 1, 2015

(87) PCT Pub. No.: WO2014/112001
PCT Pub. Date: Jul. 24, 2014

(65) Prior Publication Data
US 2015/0334551 A1 Nov. 19, 2015

(30) Foreign Application Priority Data

Jan. 15, 2013 (JP) ................. 2013-004434

(51) Int. Cl.
*H04W 8/06* (2009.01)
*H04W 24/08* (2009.01)
(Continued)

(52) U.S. Cl.
CPC ........... *H04W 8/065* (2013.01); *H04W 24/08* (2013.01); *H04W 76/15* (2018.02);
(Continued)

(58) Field of Classification Search
CPC ..... H04W 8/08; H04W 76/025; H04W 24/10; H04W 24/08; H04W 84/045; H04W 76/022; H04W 36/0055; H04W 48/20
(Continued)

(56) References Cited

U.S. PATENT DOCUMENTS 8,917,684 B2 * 12/2014 Kim ................. H04W 4/06
370/329
9,113,450 B2 * 8/2015 Pelletier ................ H04W 74/04
(Continued)

FOREIGN PATENT DOCUMENTS

WO WO-2011/137784 A1 11/2011

OTHER PUBLICATIONS

Extended European Search Report issued by the European Patent Office for Application No. 13871864.8 dated Jul. 20, 2016 (11 pages).

(Continued)

*Primary Examiner* — Kwang B Yao
*Assistant Examiner* — Syed M Bokhari
(74) *Attorney, Agent, or Firm* — Wilmer Cutler Pickering Hale and Dorr LLP

(57) ABSTRACT

A first base station (1) that operates a first cell (10) is configured to receive, from a mobile station (4) through a signaling radio bearer in the first cell (10), a signal containing a NAS message that causes a setup of a data bearer in a data transfer apparatus (7) within a core network (5). The first base station (1) is also configured to forward the NAS message from the mobile station (4) to a mobility management apparatus (6) within the core network (5) and transmit, to the mobility management apparatus (6), base station information indicating a selected base station that has been selected from at least one second base station (2) and terminates a data bearer for the mobile station (4). It is thus, (Continued)

for example, possible to contribute to a simple establishment of a U-Plane bearer in a dual-connectivity scenario.

34 Claims, 21 Drawing Sheets

(51) Int. Cl.
*H04W 76/15* (2018.01)
*H04W 48/20* (2009.01)
*H04W 36/00* (2009.01)
*H04W 84/04* (2009.01)
*H04W 76/12* (2018.01)

(52) U.S. Cl.
CPC ........ *H04W 36/0055* (2013.01); *H04W 48/20* (2013.01); *H04W 76/12* (2018.02); *H04W 84/045* (2013.01)

(58) Field of Classification Search
USPC ........................................ 370/252, 329, 331
See application file for complete search history.

(56) References Cited

U.S. PATENT DOCUMENTS 9,225,449 B2 * 12/2015 Heo .................... H04W 76/048
9,538,438 B2 * 1/2017 Wang .................... H04W 36/04
9,692,567 B1 * 6/2017 Vaidya .................. H04L 5/0037
2014/0004863 A1 1/2014 Zhang et al.

OTHER PUBLICATIONS

Kishiyama. Y., et al., "Evolution Concept and Candidate Technologies for Future Steps of LTE-A," Proceedings of the 2012 IEEE Communication Systems (ICCS), pp. 473-477 (Nov. 21, 2012).
International Search Report, Corresponding to PCT/JP2013/007176, dated Mar. 4, 2014, 1 page.
Hiroyuki Ishii et al., "A Novel Architecture for LTE-B C-plane/U-plane Split and Phantom Cell Concept," Globecom Workshops (GC Wkshps), 2012 IEEE, Dec. 3, 2012. pp. 624-630, 7 pages.
NEC, "Consideration of the Possible Structures on the Dual Connectivity," 3GPP TSG-RAN WG2 Meeting 81, R2-130268, Jan. 28, 2013, 5 pages.
3GPP TR 36.932 V12.0.0 Technical Report, "3rd Generation Partnership Project; Technical Specification Group Radio Access Network; Scenarios and Requirements for Small Cell Enhancements for E-UTRA and E-UTRAN (Release 12)," Dec. 2012, 14 pages.
3GPP RP-122033, NTT DOCOMO, "New Study Item Description: Small Cell Enhancements for E-UTRA and E-UTRAN-Higher-layer Aspects," 3GPP TSG RAN Meeting #58, Barcelona, Spain, Dec. 2012, 5 pages.
3GPP RWS-120010, NTT DOCOMO, Inc., "Requirements, Candidate Solutions and Technology Roadmap for LTE Rel-12 Onward," 3GPP TSG RAN Workshop on Rel-12 and Onwards, Ljublljana, Slovenia, Jun. 11-12, 2012, 27 pages.

* cited by examiner

RADIO COMMUNICATION SYSTEM, BASE STATION, MOBILE STATION, COMMUNICATION CONTROL METHOD, AND NON-TRANSITORY COMPUTER READABLE MEDIUM

CROSS-REFERENCE TO RELATED APPLICATIONS

The present application is a national stage application of International Application No. PCT/JP2013/007176 entitled "Radio Communication System, Base Station, Mobile Station, Communication Control method, and Non-Transitory Computer Readable Medium," filed on Dec. 6, 2013, which claims the benefit of priority from Japanese Patent Application No. JP2013-004434, filed on Jan. 15, 2013, the disclosures of which are incorporated herein in their entirety by reference thereto.

TECHNICAL FIELD

The present invention relates to a radio communication system, and more particularly, to network architecture in a small cell enhancement scenario.

BACKGROUND ART

In the Long Term Evolution (LTE) Release 12 according to the 3rd Generation Partnership Project (3GPP), "local area enhancement" or "small cell enhancement" for accommodation of a large amount of local traffic, improvement in throughput, and efficient use of a high-frequency band has become one of the subjects for discussion (see Non-patent literature 1). In the local area enhancement or the small cell enhancement, a low-power node (LPN) that forms a small cell is used.

Further, a dual-connectivity scenario has been proposed regarding the small cell enhancement (see Non-Patent literature 2). In one example of the dual connectivity, it is assumed that a macro cell provides a control plane (e.g., Radio Resource Control (RRC) connection and Non-Access Stratum (NAS) message forwarding) for a mobile station (User Equipment (UE)) and a small cell provides a user plane for the UE. This example of the dual connectivity may be referred to as a C/U-plane split. In one specific example of the dual-connectivity scenario, for the Control plane (C-plane), the macro cell can keep a good connection with the UE by a wide coverage using a low frequency band and to support mobility of the UE. Meanwhile, for the user plane (U-plane), the small cell can provide a local high throughput for the UE by using a wide bandwidth in a high frequency band.

In the dual-connectivity scenario, a case in which a small cell does not require transmission of existing cell specific signals/channels (e.g., Primary Synchronization Signal (PSS), Secondary Synchronization Signal (SSS), Cell-specific Reference Signal (CRS), Master Information Block (MIB), and System Information Block (SIB)) is also assumed. Such a new small cell may be referred to as a phantom cell. Further, a base station (eNB) or an LPN that provides a small cell may be referred to as a Phantom eNodeB (PhNB).

CITATION LIST

Non Patent Literature

[Non-Patent Literature 1] 3GPP RWS-120010, NTT DOCOMO, "Requirements, Candidate Solutions & Technology Roadmap for LTE Rel-12 Onward", 3GPP TSG RAN Workshop on Rel-12 and Onwards, Ljubljana, Slovenia, 11-12 Jun. 2012

[Non-Patent Literature 2] 3GPP RP-122033, NTT DOCOMO, "New Study Item Description: Small Cell enhancements for E-UTRA and E-UTRAN—Higher-layer aspects", 3GPP TSG RAN Meeting#58, Barcelona, Spain, 4-7 Dec. 2012

SUMMARY OF INVENTION

Technical Problem

As described above, the dual-connectivity scenario in which the C-plane is provided for UEs in a cell controlled by the MeNB and the U-plane is provided for the UEs in a cell controlled by the LPN has been proposed. In the following description, a cell that provides the C-Plane in the dual-connectivity scenario is referred to as a primary cell (PCell) and a cell that provides the U-Plane in the dual-connectivity scenario is referred to as a secondary cell (SCell).

The present inventors have studied about processing for establishing a U-Plane bearer in the SCell in the dual-connectivity scenario and have found various problems therewith. For example, in the LTE, a mobility management apparatus (i.e., Mobility Management Entity (MME)) in a core network executes a procedure for establishing the U-Plane bearer (i.e., E-RAB and S5/S8 bearer) in response to receiving a NAS message (e.g., Attach Request or Service Request) transmitted from the UE. Considering the dual-connectivity scenario, the MME need to set a data bearer that passes through an LPN (SCell), which is different from the MeNB (PCell), in response to the NAS message received through the MeNB (PCell). However, since the MME does not know to which LPN the U-Plane bearer should be set, it is impossible to set up the U-Plane bearer that passes through an appropriate LPN.

Accordingly, one object of the present invention is to provide a radio communication system, a base station, a mobile station, a communication control method, and a program that contribute to a simple establishment of a U-Plane bearer in the dual-connectivity scenario.

Solution to Problem

In a first aspect, a radio communication system includes: a first base station that operates a first cell; at least one second base station, each of which operates a second cell; a core network that includes a mobility management apparatus and a data transfer apparatus; and a mobile station. The mobile station has a capability to establish a data radio bearer in the second cell when the mobile station has established a signaling radio bearer in the first cell. The first base station is configured to receive, from the mobile station through the signaling radio bearer, a signal containing a NAS message that causes a setup of a data bearer in the data transfer apparatus. The first base station is further configured to forward the NAS message to the mobility management apparatus and send, to the mobility management apparatus, base station information indicating a selected base station that has been selected from the at least one second base station and terminates the data bearer.

In a second aspect, a first base station includes: a radio communication unit that operates a first cell; and a controller. The controller is configured to receive, from a mobile station through a signaling radio bearer in the first cell, a signal containing a NAS message that causes a setup of a data bearer in a data transfer apparatus within a core network. The controller is further configured to forward the NAS message to a mobility management apparatus within the core network and send, to the mobility management apparatus, base station information indicating a selected base station that has been selected from at least one second base station and terminates the data bearer.

In a third aspect, a mobile station is used in combination with the radio communication system according to the first aspect stated above, and includes a radio communication unit and a controller. The controller is configured to control the radio communication unit to receive configuration information regarding the data radio bearer from the first base station and receive or transmit user data through the second cell.

In a fourth aspect, a communication control method in a first base station that operates a first cell includes:

(a) receiving, from a mobile station through a signaling radio bearer in the first cell, a signal containing a NAS message that causes a setup of a data bearer in a data transfer apparatus within a core network; and (b) forwarding the NAS message to a mobility management apparatus within the core network and sending, to the mobility management apparatus, base station information indicating a selected base station that has been selected from at least one second base station and terminates the data bearer.

In a fifth aspect, a program includes instructions for causing a computer to perform the communication control method according to the above fourth aspect.

Advantageous Effects of Invention

According to the above aspects, it is possible to provide a radio communication system, a base station, a mobile station, a communication control method, and a program that contribute to a simple establishment of a U-Plane bearer in the dual-connectivity scenario.

DESCRIPTION OF EMBODIMENTS

Hereinafter, with reference to the drawings, specific embodiments will be described in detail. Throughout the drawings, identical or corresponding components are denoted by the same reference symbols, and overlapping descriptions will be omitted as appropriate for the sake of clarification of description.

First Embodiment

Figure 1:
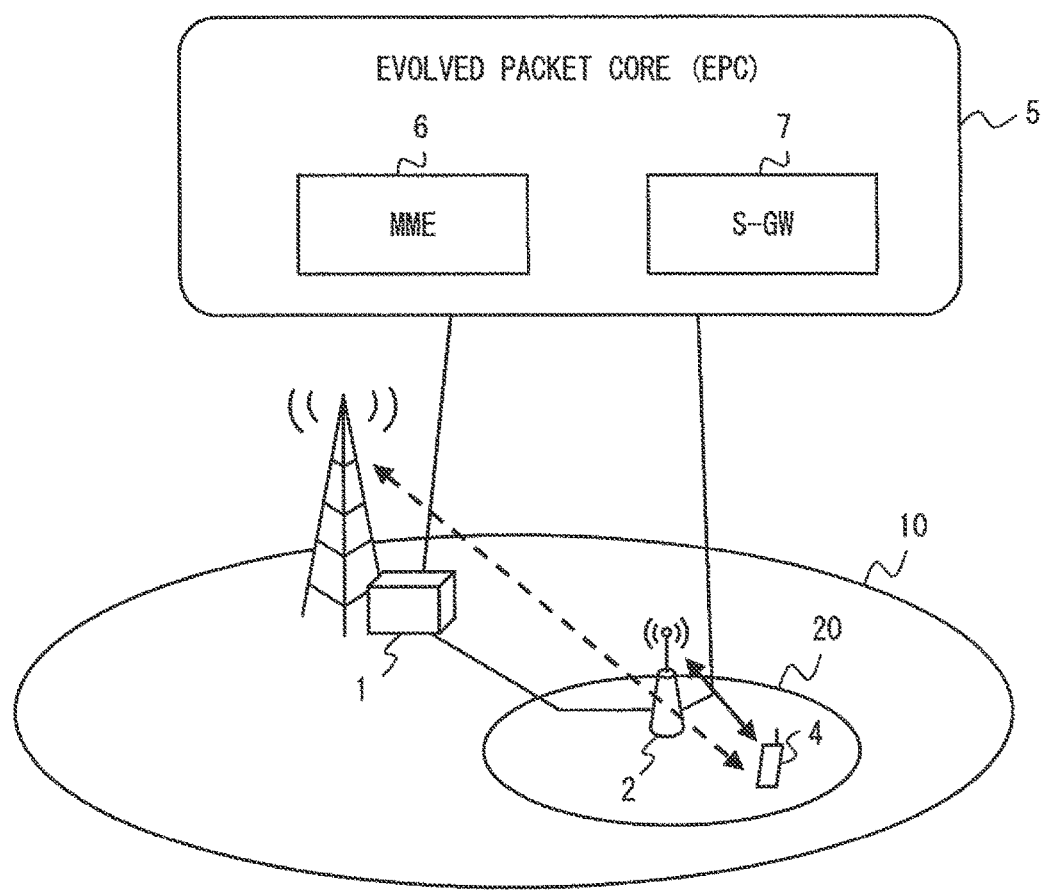
FIG. 1 is a diagram showing a configuration example of a radio communication system (e.g., LTE system) according to a first embodiment.

FIG. 1 shows a configuration example of a radio communication system according to this embodiment. The radio communication system according to this embodiment includes a first base station 1, a second base station 2, a mobile station 4, and a core network 5. The base stations 1 and 2 operate a first cell 10 and a second cell 20, respectively. The core network 5 includes a mobility management apparatus 6 and a data transfer apparatus 7. In the following description, for the sake of simplification of the description, a case in which the radio communication system according to this embodiment is an LTE system will be described as an example. Accordingly, the first base station 1 corresponds to an MeNB, the second base station 2 corresponds to an LPN, the mobile station 4 corresponds to a UE, the core network 5 corresponds to an Evolved Packet Core (EPC), the mobility management apparatus 6 corresponds to a Mobility Management Entity (MME), and the data transfer apparatus 7 corresponds to a Serving Gateway (S-GW).

The radio communication system according to this embodiment applies dual-connectivity to the cells 10 and 20. That is, the UE 4 supports dual-connectivity (e.g., C/U-plane split). In other words, the UE 4 has a capability to establish a data radio bearer (DRB) in the cell 20 when the UE 4 has established a signaling radio bearer (SRB) in the cell 10. The LPN 2 provides U-Plane services for the UE 4 in the cell 20. In other words, the LPN 2 establishes the DRB with the UE 4 in the cell 20 and transfers user data of the UE 4. The MeNB 1 provides C-plane services in the cell 10 for the UE 4, which establishes the DRB with the LPN 2. In other words, the MeNB 1 establishes the SRB with the UE 4 in the cell 10 and provides RRC signaling, for example, to establish and modify the DRB in the cell 20 of the LPN 2, and NAS message transfer between the EPC 5 and the UE 4. The MeNB 1 may transmit, on a downlink channel of the cell 10 (e.g., Physical Broadcast Channel (PBCH) or Physical Downlink Shared Channel (PDSCH)), master information (e.g., system bandwidth and the number of transmission antennas) and system information (e.g., parameters regarding the DRB in the cell 20) regarding the cell 20 of the LPN 2.

The MeNB 1 may not provide all the C-plane services regarding the UE 4. For example, the LPN 2 may control a layer 1 (physical layer) and a layer 2 (Media Access Control (MAC) sublayer and Radio Link Control (RLC) sublayer) regarding the data radio bearer that is established for the LPN 2. Specifically, the LPN 2 may receive layer 1/layer 2 control signals (e.g., Hybrid Automatic Repeat Request (H-ARQ) ACK, Channel Quality Indicator (CQI), Precoding Matrix Indicator (PMI), and Rank Indicator (RI)) using an uplink control channel (e.g., Physical Uplink Control Channel (PUCCH)) or an uplink data channel (e.g., Physical Uplink Shared Channel (PUSCH)). The LPN 2 may transmit downlink scheduling information, ACK/NACK for uplink transmission and the like to the UE 4 using a downlink control channel (e.g., Physical Downlink Control Channel (PDCCH)).

The EPC 5 is a core network that is generally managed by an operator that provides mobile communication services. The EPC 5 has control plane (C-plane) functions including mobility management (e.g., location registration and location update) and bearer management (e.g., bearer establishment, bearer modification, and bearer release) of the UE 4, and user plane (U-plane) functions including transferring user data of the UE 4 between the MeNB 1 and an external network (not shown) and between the LPN 2 and the external network. The MME 6 contributes to the C-plane functions in the EPC. The S-GW 7 contributes to the U-plane functions in the EPC. The S-GW 7 is arranged at a boundary between the EPC 5 and a radio access network (RAN) including the MeNB 1 and the LPN 2.

FIG. 1 shows only one LPN 2 arranged in the cell 10 of the MeNB 1. However, a plurality of LPNs 2 and a plurality of second cells 20 may be arranged in the cell 10 of the MeNB 1. The MeNB 1 selects a selected LPN that establishes the U-Plane bearer for the UE 4 from at least one LPN 2.

Next, a procedure for establishing the U-Plane bearer for the UE 4 according to this embodiment will be described further in detail. The MeNB 1 according to this embodiment is configured to receive, from the UE 4 through the SRB in the cell 10, an RRC message (RRC signal) containing a NAS message that causes a setup of the U-Plane bearer (i.e., S1 bearer, E-RAB, or EPS bearer) in the S-GW 7. The NAS message that causes the setup of the U-Plane bearer is, for example, Attach Request, Service Request, or Tracking Area Update (TAU) Request.

Further, the MeNB 1 is configured to forward the NAS message from the UE 4, which supports the dual connectivity, to the MME 6 and to send LPN information to the MME 6. The LPN information indicates the selected LPN that has been selected from at least one LPN 2 and terminates an S1 bearer for the UE 4. The MME 6 receives the LPN information. Therefore, the MME 6 can know an appropriate LPN 2 (i.e., the selected LPN) that should establish the S1 bearer and can set up the S1 bearer between the S-GW 7 and the appropriate selected LPN.

The LPN information includes identification information that can specify the selected LPN (e.g., a base station ID, a cell ID, or a base station address). The LPN information indicates, for example, a base station ID of the selected LPN (E-UTRAN Cell Global ID (ECGI)), a cell ID of the selected LPN, or a tunnel endpoint ID (TEID) of the selected LPN, or a combination thereof.

In one example, the MeNB 1 may send the LPN information together with the NAS message that causes the setup of the U-Plane bearer. In this case, the MeNB 1 may include the LPN information into an "S1-AP: INITIAL UE MESSAGE" that is used to send the NAS message to the MME 6. Alternatively, the MeNB 1 may send the LPN information to the MME 6 after forwarding the NAS message to the MME 6. Specifically, the MeNB 1 may receive, after forwarding the NAS message to the MME 6, a bearer context regarding the S1 bearer from the MME 6, send the bearer context to the selected LPN, and send the LPN information to the MME 6 after the S1 bearer has been configured in the selected LPN. In this case, the MeNB 1 may include the LPN information into an "S1-AP: INITIAL CONTEXT SETUP COMPLETE MESSAGE" that is used to notify the MME 6 of the completion of the bearer setup.

Figure 2:
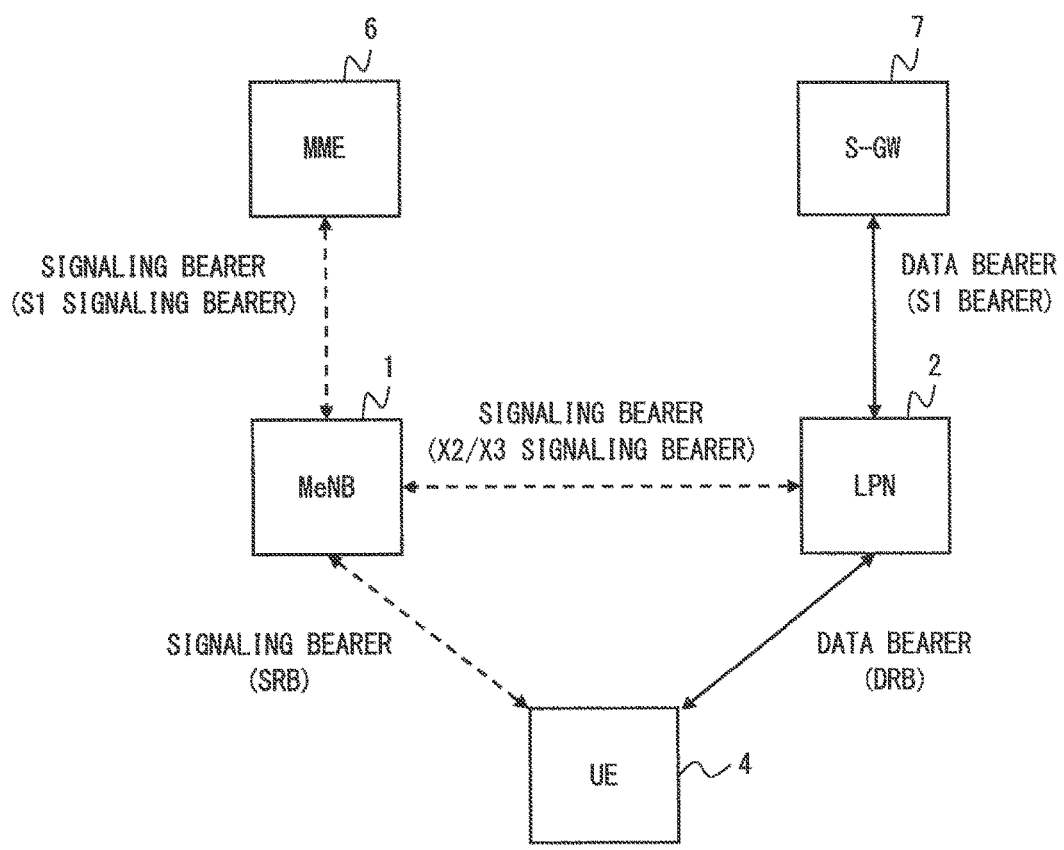
FIG. 2 is a diagram showing one example of bearer architecture in the radio communication system according to the first embodiment.

In the following description, with reference to FIGS. 2 and 3, the bearer architecture according to this embodiment will be described. FIG. 2 shows a first example of the bearer architecture related to the user data transfer in the cell 20. The radio bearer has already been described above. That is, the MeNB 1 establishes the SRB with the UE 4, and provides, in the cell 10, C-plane services including RRC signaling, for example, to establish and modify the DRB in the cell 20 and NAS message transfer between the EPC 5 and the UE 4. Meanwhile, the LPN 2 establishes the DRB with the UE 4 and transmits and receives the user data of the UE 4 on the cell 20.

Next, bearers between the EPC 5 and the MeNB 1 and between the EPC 5 and the LPN 2 will be described. A signaling bearer with the EPC 5 (i.e., S1 signaling bearer using an S1-MME interface) is established between the MME 6 and the MeNB 1. The MeNB 1 establishes the S1 signaling bearer with the MME 6 and sends and receives S1 Application Protocol (S1-AP) messages to and from the MME 6. Meanwhile, a data bearer with the EPC 5 (i.e., S1 bearer using an S1-U interface) is established between the S-GW 7 and the LPN 2. The LPN 2 establishes the S1 bearer with the S-GW 7 and sends and receives user data of the UE 4 to and from the S-GW 7.

Further, the MeNB 1 establishes a signaling bearer with the LPN 2. The signaling bearer between the MeNB 1 and the LPN 2 is established using, for example, an X2 interface. The X2 interface is an interface between eNBs. A case in which the LPN 2 is defined as a new node and a new interface different from the X2 interface is defined between the eNB and the LPN may be considered. In this case, the signaling bearer between the MeNB 1 and the LPN 2 may be established using this new interface. In this specification, this new interface is provisionally referred to as an X3 interface. The MeNB 1 is configured to send, to the LPN 2 via an X2/X3 signaling bearer, the bearer context (hereinafter referred to as E-UTRAN Radio Access Bearer (E-RAB) configuration information) that is necessary to establish the S1 bearer with the S-GW 7 and the DRB with the UE 4 in the LPN 2. The E-RAB is a radio access bearer including the DRB and the S1 bearer.

According to the bearer architecture shown in FIG. 2, the LPN 2 does not require the S1 signaling bearer with the MME 6 and can set up the DRB and the S1 bearer based on E-RAB configuration information supplied from the MeNB 1. In addition, in the above-mentioned bearer architecture, a termination point of the S1 bearer (S1-U bearer) is different from a termination point of the S1 signaling bearer. That is, the LPN 2, not the MeNB 1, terminates the S1 bearer. That is, in the architecture shown in FIG. 2, the C/U planes are separated not only with regard to the signaling in the RAN but also with regard to the interfaces between the EPC 5 and the RAN. As a result of this, the MeNB 1 is only required to perform signaling to establish the S1 bearer and the DRB necessary for the UE 4 to transmit and receive user data via the cell 20 and the LPN 2. In other words, in one example, the MeNB 1 needs not to terminate the S1 bearer (i.e., GPRS Tunneling Protocol (GTP) tunnel) for the communication of the UE 4 via the cell 20, and also needs not to perform forwarding of user data packets between the S1 bearer and the DRB. These processing are performed by the LPN 2. Accordingly, in one example, it is possible to reduce the processing load on the MeNB 1.

The S1 bearer is a GTP tunnel and the user data (data packet) is encapsulated in GTP tunnel packets to be transferred between the S-GW 7 and the LPN 2. For example, the GTP tunnel packets that encapsulate downlink user data arrive at the LPN 2 by being subjected to routing and forwarding by routers arranged between the S-GW 7 and the LPN 2. Accordingly, in the bearer architecture shown in FIG. 2, typically, the GTP tunnel packets are transferred without passing through the MeNB 1. In this case, the MeNB 1 need not carry out processing for terminating the S1 bearer and thus it is possible to reduce the processing load on the MeNB 1. Further, since the GTP tunnel packets do not flow through the X2/X3 interface between the MeNB 1 and the LPN 2, performance requirements on the capacity, the delay and the like of the X2/X3 interface are relaxed. It is possible, for example, to use a non-optical fiber line (e.g., wireless communication path) for the X2/X3 interface.

However, in some implementations, the GTP tunnel packets that encapsulate the user data may be transferred between the S-GW 7 and the LPN 2 via the MeNB 1. In this case, the MeNB 1 may function as a router (e.g., Internet Protocol (IP) router) and may perform routing and forwarding of the GTP tunnel packets. The routing of the GTP tunnel packets that pass through the MeNB 1 can be achieved by setting up routing tables included in the S-GW 7, the LPN 2, and the MeNB 1.

Figure 3:
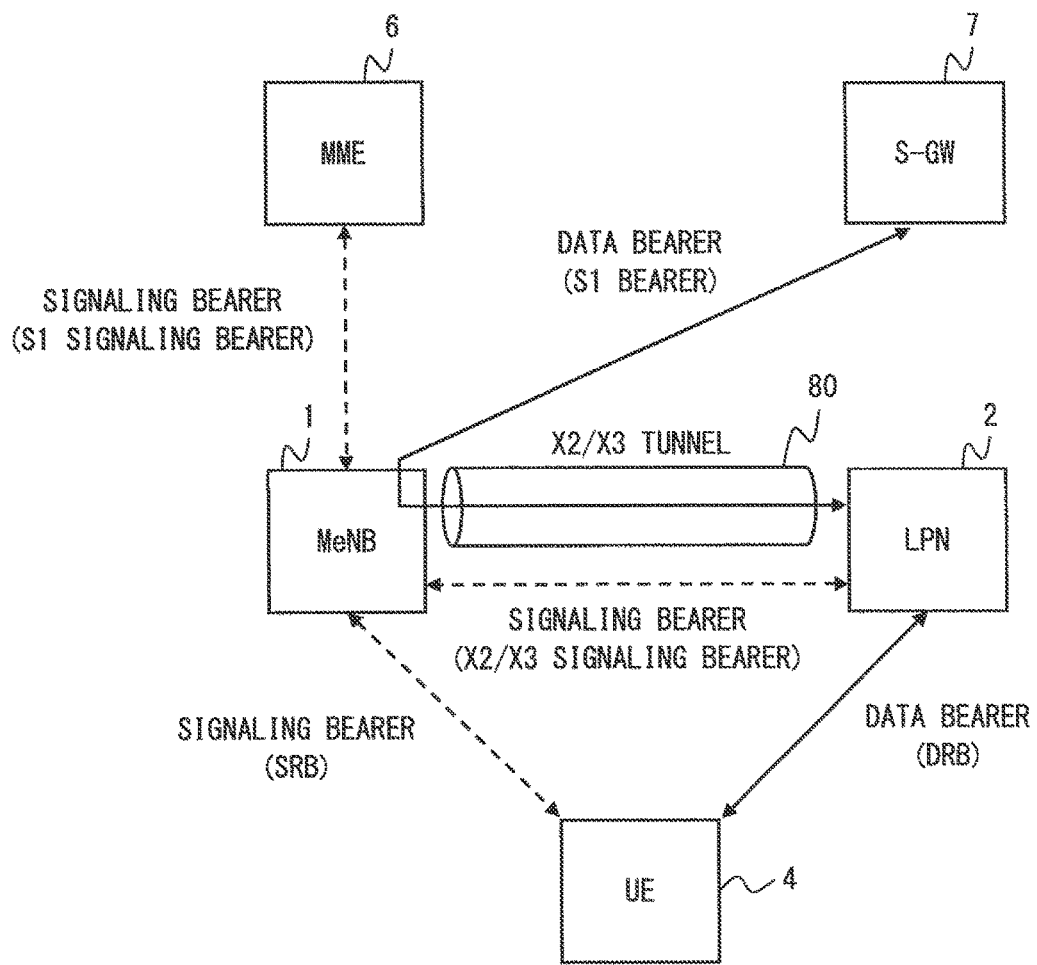
FIG. 3 is a diagram showing another example of the bearer architecture in the radio communication system according to the first embodiment.

FIG. 3 shows a second example of the bearer architecture. In the example shown in FIG. 3, the MeNB 1 performs routing and forwarding of the GTP tunnel packets. The MeNB 1 may have a proxy function to convert the IP addresses of the GTP tunnel packets. Specifically, the MeNB 1 and the LPN 2 set up a tunnel 80 (e.g., GTP Tunnel) via the X2/X3 interface. The MeNB 1 further encapsulates the GTP tunnel packets, which encapsulate the user data on the S1 bearer between the S-GW 7 and the LPN 2, and forwards the encapsulated GTP tunnel packets using the tunnel 80. The tunnel 80 may be omitted. That is, the MeNB 1 may directly forward the GTP tunnel packets without performing further encapsulation of the GTP tunnel packets.

One notable point in the example shown in FIG. 3 is that the MeNB 1 need not terminate the S1 bearer. The MeNB 1 is only required to operate as a router that forwards the GTP tunnel packets and need not perform decapsulation processing to retrieve user packets. Accordingly, an increased processing load on the MeNB 1 which is due to the GTP tunnel termination does not occur.

Another notable point in the example shown in FIG. 3 is that the MeNB 1 can monitor the GTP tunnel packets. The MeNB 1 can monitor, for example, the traffic amount of the GTP tunnel packets to be forwarded. By monitoring the traffic amount of the GTP tunnel packets, the MeNB 1 can autonomously estimate the load on the cell 20 or the load on the LPN 2. Accordingly, the MeNB 1 according to this embodiment can determine deactivation of the cell 20 or the E-RAB that passes through the LPN 2, based on the traffic amount of the GTP tunnel packets monitored by the MeNB 1.

Figure 4:
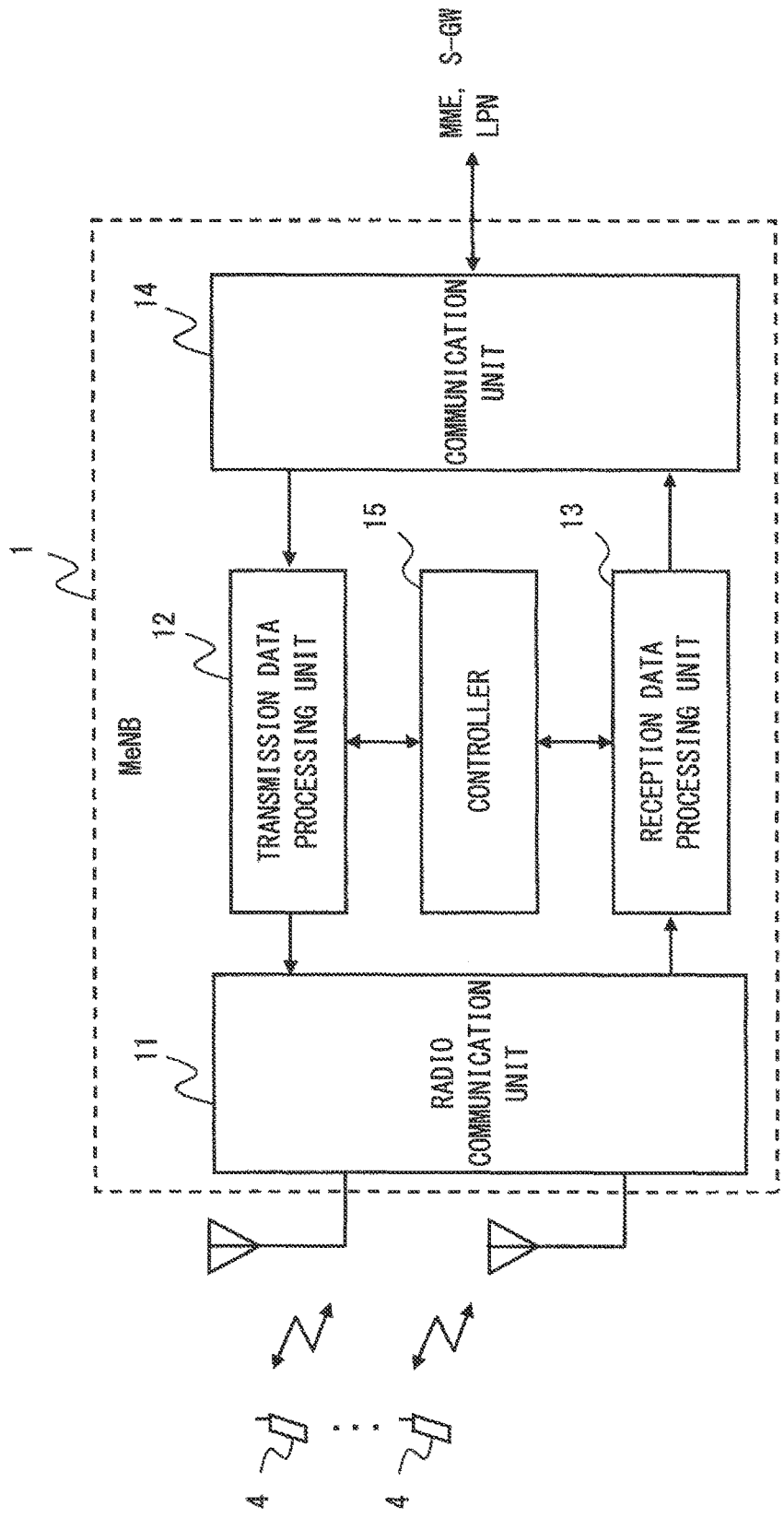
FIG. 4 is a diagram showing a configuration example of a first base station (e.g., MeNB) according to the first embodiment.

In the following description, configuration examples of the MeNB 1, the LPN 2, the UE 4, the MME 6, and the S-GW 7 according to this embodiment will be described. FIG. 4 is a block diagram showing a configuration example of the MeNB 1. A radio communication unit 11 receives an uplink signal transmitted from the UE 4 via an antenna. A reception data processing unit 13 restores the received uplink signal. The resultant received data is forwarded to another network node (e.g., the MME 6 or the S-GW 7) via a communication unit 14. For example, uplink user data received from the UE 4 in the cell 10 is forwarded to the S-GW 7. Further, NAS data among control data received from the UE 4 is forwarded to the MME 6. Further, the reception data processing unit 13 receives from a controller 15 the control data to be transmitted to the LPN 2 or the MME 6 and sends the control data to the LPN 2 or the MME 6 via the communication unit 14.

A transmission data processing unit 12 obtains user data destined for the UE 4 from the communication unit 14, and generates a transport channel by performing error correction coding, rate matching, interleaving and the like on the user data. The transmission data processing unit 12 then generates a transmission symbol sequence by adding control information to the data sequence of the transport channel. The radio communication unit 11 generates a downlink signal by performing processing such as carrier wave modulation based on the transmission symbol sequence, frequency conversion, and signal amplification, and transmits the generated downlink signal to the UE 4. Furthermore, the transmission data processing unit 12 receives the control data to be transmitted to the UE 4 from the controller 15 and transmits the control data to the UE 4 via the radio communication unit 11.

The controller 15 performs signaling with the MME 6, the LPN 2, and the UE 4 via the signaling bearers in order to enable the UE 4 to receive or transmit the user data through the cell 20 operated by the LPN 2. Specifically, the controller 15 sends, to the MME 6 via the S1 signaling bearer, the NAS message (e.g., Attach Request, Service Request, or TAU Request) that causes a setup of the U-Plane bearer. The controller 15 sends, to the LPN 2 via the X2/X3 signaling bearer, the E-RAB configuration information that is necessary to establish the S1 bearer and the DRB in the LPN 2. The controller 15 sends, to the UE 4 via the SRB in the cell 10, the DRB configuration information that is necessary to establish the DRB in the cell 20 in the UE 4. Further, as already described above, when forwarding to the MME 6 the NAS message from the UE 4 that supports the dual connectivity, the controller 15 sends to the MME 6 the LPN information indicating the selected LPN.

The controller 15 may be configured to receive measurement information regarding at least one LPN 2 (hereinafter referred to as LPN measurement information) from the UE 4 and select the selected LPN from at least one LPN 2. The LPN measurement information includes, for example, measurement results regarding the radio quality in the UE 4 (e.g., Reference Signal Received Power (RSRP) or Reference Signal Received Quality (RSRQ)). The LPN measurement information may further include a list of the LPNs 2 detected by the UE 4 (e.g., a list of base station IDs or a list of cell IDs). The controller 15 may select, as the selected LPN, a LPN 2 of which the radio quality measured by the UE 4 is the highest based on the LPN measurement information. In one example, before forwarding the NAS message for establishing the U-Plane bearer to the MME 6, the controller 15 may receive the LPN measurement information from the UE 4 to determine the selected LPN. In another example, the controller 15 may receive, after forwarding the NAS message to the MME 6, the bearer context (E-RAB configuration information) regarding the E-RAB containing the S1 bearer from the MME 6, and then receive the LPN measurement information from the UE 4, determine the selected LPN, and then send the E-RAB configuration information to the selected LPN.

Figure 5:
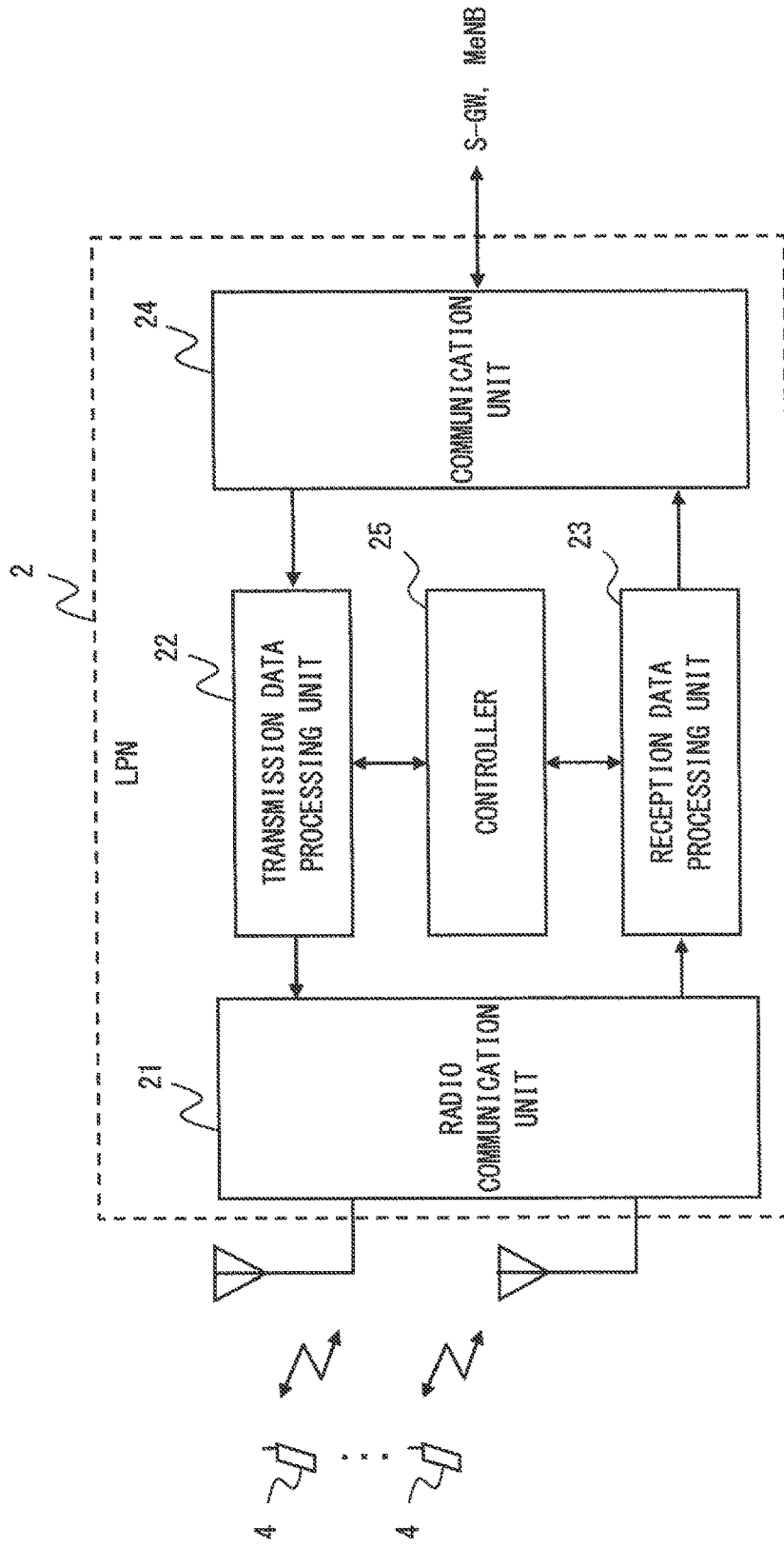
FIG. 5 is a diagram showing a configuration example of a second base station (e.g., LPN) according to the first embodiment.

FIG. 5 is a block diagram showing a configuration example of the LPN 2. The functions and the operations of a radio communication unit 21, a transmission data processing unit 22, a reception data processing unit 23, and a communication unit 24 shown in FIG. 5 are similar to those of the corresponding elements of the base station 1 shown in FIG. 4 (i.e., the radio communication unit 11, the transmission data processing unit 12, the reception data processing unit 13, and the communication unit 14).

A controller 25 of the LPN 2 receives the E-RAB configuration information from the MeNB 1 (controller 15) via the X2/X3 signaling bearer, and sets up the S1 bearer with the S-GW 7 and the SRB with the UE 4 in accordance with the E-RAB configuration information.

Figure 6:
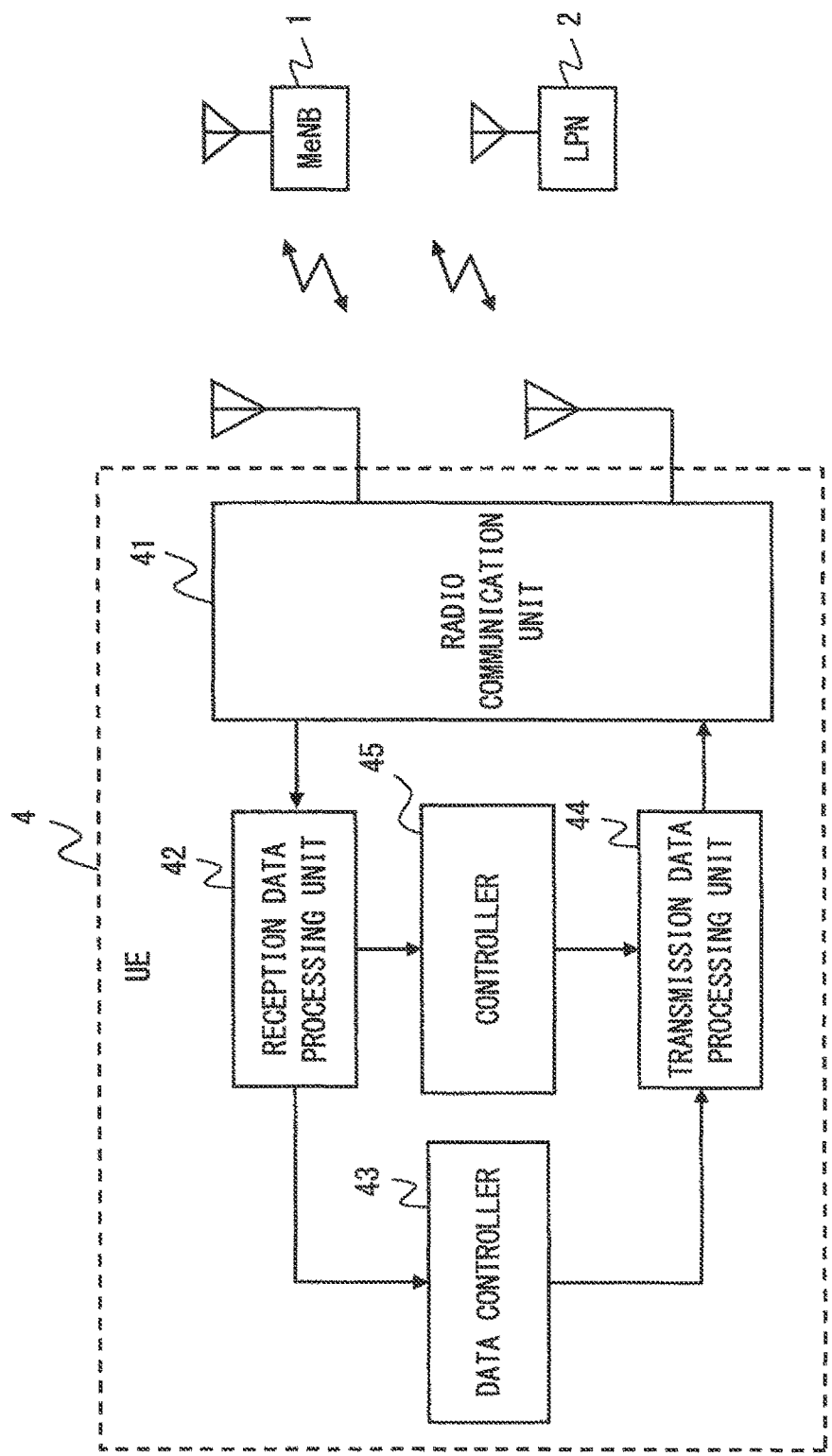
FIG. 6 is a diagram showing a configuration example of a mobile station (e.g., UE) according to the first embodiment.

FIG. 6 is a block diagram showing a configuration example of the UE 4. A radio communication unit 41 can communicate with both the cell 10 and the cell 20. In addition, the radio communication unit 41 may support carrier aggregation of a plurality of cells operated by different eNBs. In this case, the radio communication unit 41 can simultaneously use the plurality of cells 10 and 20 to transmit or receive user data. The radio communication unit 41 receives downlink signals from one or both of the eNB 1 and the LPN 2 via an antenna. A reception data processing unit 42 restores received data from the received downlink signal, and sends the received data to a data controller 43. The data controller 43 uses the received data according to the purpose thereof. A transmission data processing unit 44 and the radio communication unit 41 generate an uplink signal using transmission data supplied from the data controller 43, and transmit the uplink signal to one or both of the eNB 1 and the LPN 2.

A controller 45 of the UE 4 controls the radio communication unit 41 to establish the SRB with the MeNB 1 on the cell 10. The controller 45 then receives from the MeNB 1 the DBB configuration information to establish the DRB with the LPN 2 and controls the radio communication unit 41 to transmit or receive the user data through the cell 20. Accordingly, the UE 4 can communicate with the LPN 2 via the DRB based on the signaling with the MeNB 1.

Further, the controller 45 may measure downlink signals from at least one LPN 2 and transmit the LPN measurement information to the MeNB 1. As already stated above, the LPN measurement information is used by the MeNB 1 to determine the selected LPN.

Figure 7:
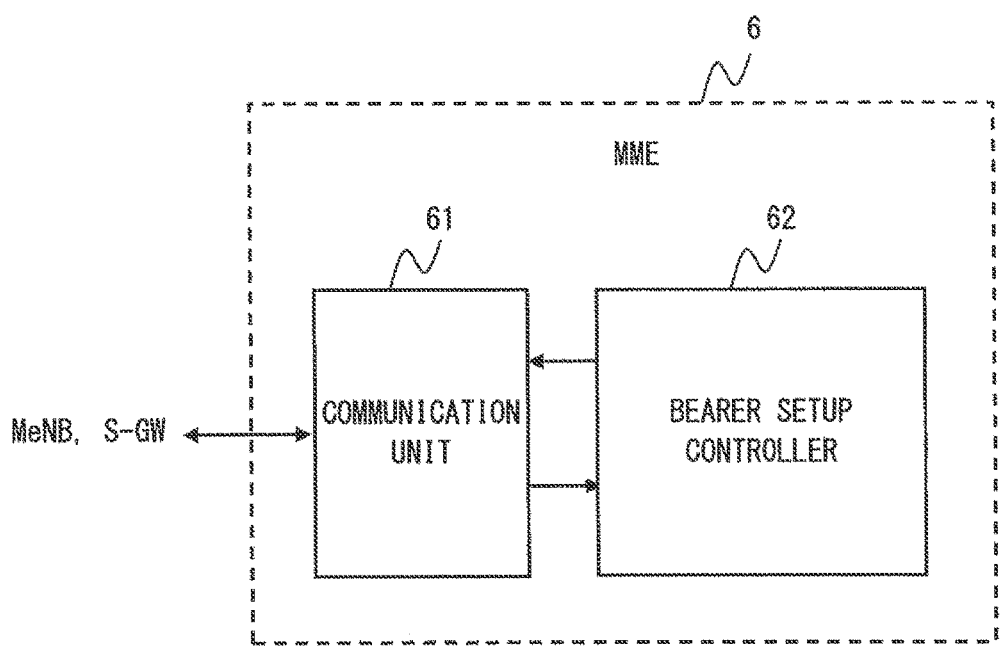
FIG. 7 is a diagram showing a configuration example of a mobility management apparatus (e.g., MME) according to the first embodiment.

FIG. 7 is a block diagram showing a configuration example of the MME 6. A communication unit 61 communicates with the MeNB 1 and the S-GW 7. A bearer setup controller 62 communicates with the MeNB 1 and the S-GW 7 via the communication unit 51, and controls the setup of the data bearer (E-RAB or S1 bearer) or the signaling bearer (S1 signaling bearer) in these apparatuses. Specifically, in response to receiving the initial NAS message (e.g., Attach Request, Service Request, or TAU Request) from the UE 4 via the MeNB 1, the bearer setup controller 62 requests the S-GW 7 to set up the S1 bearer and sends to the MeNB 1 the bearer configuration information regarding the E-RAB (i.e., E-RAB configuration information).

Further, the bearer setup controller 62 receives the LPN information from the MeNB 1. Accordingly, the bearer setup controller 62 can request the S-GW 7 to set up the S1 bearer with the selected LPN indicated by the LPN information. In one example, the bearer setup controller 62 may notify the S-GW 7 of the selected LPN by a first bearer setup request (Create Session Request). In another example, the bearer setup controller 62 may notify the S-GW 7 of the selected LPN by an S1 bearer update request (Modify Bearer Request).

Figure 8:
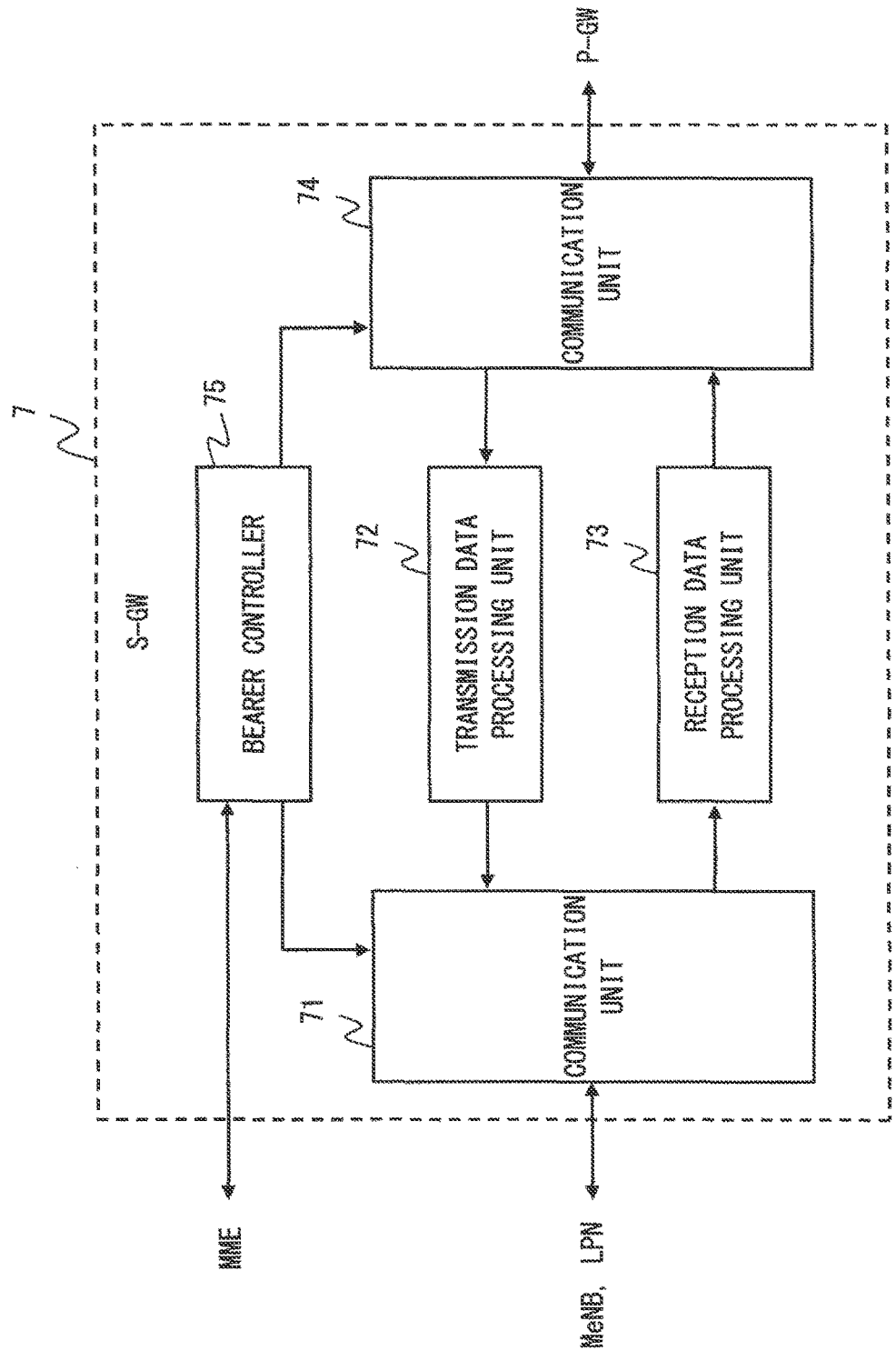
FIG. 8 is a diagram showing a configuration example of a data transfer apparatus (e.g., S-GW) according to the first embodiment.

FIG. 8 is a block diagram showing a configuration example of the S-GW 7. A communication unit 71 establishes the S1 bearer with the LPN 2 and transmits or receives user data to or from the LPN 2 through the S1 bearer. The communication unit 71 may establish the S1 bearer with the MeNB 1 to enable the UE 4 to receive or transmit the user data through the cell. A communication unit 74 sets up the S5/S8 bearer with a Packet Data Network Gateway (P-GW) in the EPC 5 and transmits and receives the user data to and from another data transfer apparatus.

A transmission data processing unit 72 receives downlink user data destined for the UE 4 from the communication unit 74, and forwards the downlink user data to the S1 bearer based on mapping between the upstream side S5/S8 bearer and the downstream side S1 bearer. A reception data processing unit 73 receives uplink user data from the communication unit 71 and forwards the uplink user data to the S5/S8 bearer based on the mapping between the S5/S8 bearer and the S1 bearer.

Figure 9:
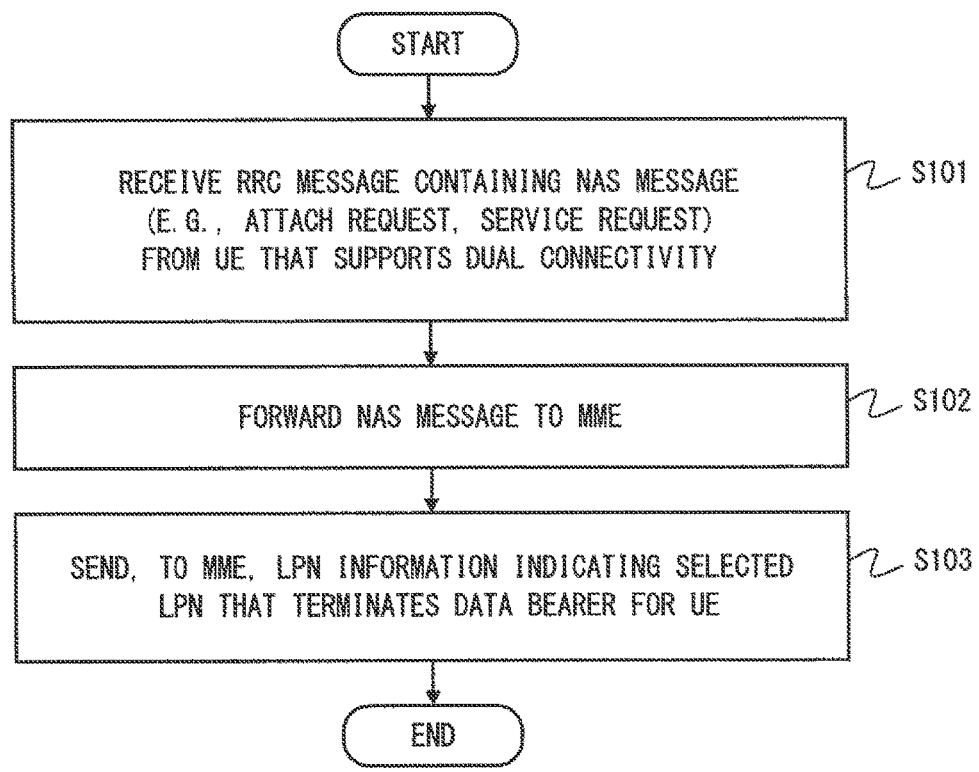
FIG. 9 is a flowchart showing an operation example of the first base station (e.g., MeNB) according to the first embodiment.

In the following description, a specific example of a procedure for establishing the U-Plane bearer in the SCell will be described. FIG. 9 is a flowchart showing an operation example of the MeNB 1 regarding the establishment of the U-Plane bearer in the SCell. In Step S101, the MeNB 1 (controller 15) receives from the UE 4, which supports the dual connectivity, the RRC message containing the NAS message (e.g., Attach Request or Service Request) that causes a setup of the U-Plane bearer. In Step S102, the MeNB 1 (controller 15) forwards, to the MME 6, the NAS message received from the UE 4. In Step S103, the MeNB 1 (controller 15) sends the LPN information to the MME 6. The LPN information indicates the selected LPN that terminates the data bearer (i.e., S1 bearer) of the UE 4.

Figure 10:
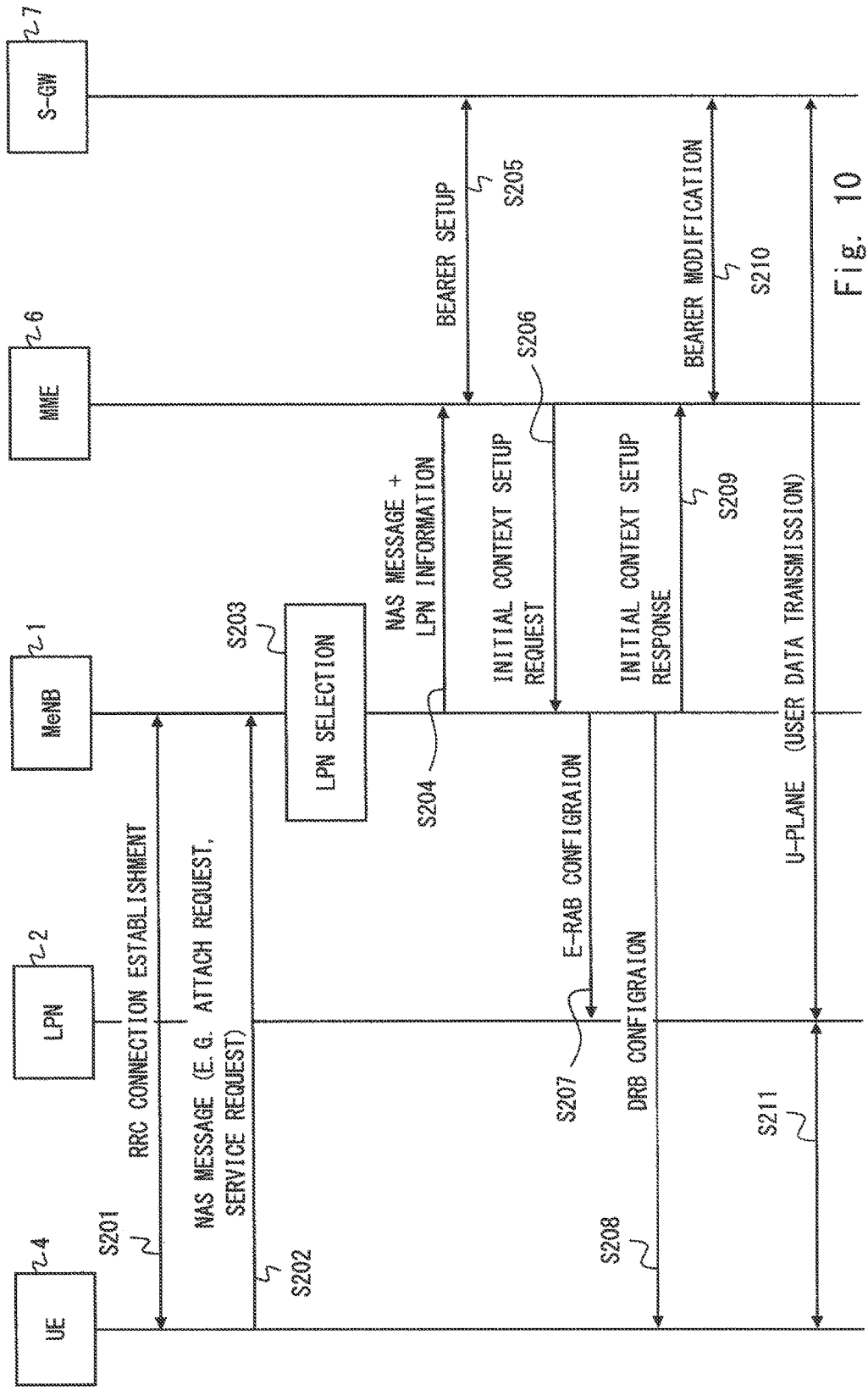
FIG. 10 is a sequence diagram showing one example of a communication control method according to the first embodiment.

FIG. 10 is a sequence diagram showing a first example of the procedure for establishing the U-Plane bearer in the SCell. In the example shown in FIG. 10, the MeNB 1 determines the selected LPN in response to receiving the RRC message containing the NAS message from the UE 4 and sends the LPN information indicating the selected LPN to the MME 6 together with the NAS message. In Step S201, the MeNB 1 and the UE 4 establish an RRC connection. In Step S202, the UE 4 sends the NAS message (e.g., Attach Request, Service Request, or TAU Request) that requests for setting up the U-Plane bearer. The establishment of the RRC connection in the LTE includes establishment of the signaling radio bearer (i.e., SRB1) and transfer of an initial uplink NAS message. That is, the NAS message transmitted in Step S202 is contained in an RRC Connection Setup Complete message transmitted to the MeNB 1 from the UE 4 at the last stage of the RRC connection establishment procedure (Step S201).

In Step S203, the MeNB 1 determines the selected LPN from at least one LPN 2. In one example, the MeNB 1 may receive the LPN measurement information from the UE 4 and determine the LPN 2 of high reception quality at the UE 4 as the selected LPN. In Step S204, the MeNB 1 forwards the NAS message to the MME 6 and sends the LPN information indicating the selected LPN to the MME 6. The MeNB 1 may include the LPN information into the "S1-AP: INITIAL UE MESSAGE" that is used to forward the NAS message.

In Step S205, the MME 6 and the S-GW 7 perform the bearer setup procedure for the UE 4. That is, the MME 6 sends a Create Session Request message to the S-GW 7. The S-GW 7 receives the Create Session Request message, generates a new entry in an EPS bearer context table, communicates with a P-GW (not shown) to configure a bearer context of the S5/S8 bearer, and configures the S-GW 7 side endpoint of the S1 bearer. The S-GW 7 sends a response (i.e., Create Session Response message) including an S1 bearer context to the MME 6. The S1 bearer context includes, for example, a tunnel endpoint identifier (TEID) and an address of the S-GW 7 in the U-plane. The TEID indicates the S-GW 7 side endpoint of the GTP tunnel as the S1 bearer. In Step S206, the MME 6 sends an INITIAL CONTEXT SETUP REQUEST message to the MeNB 1. The INITIAL CONTEXT SETUP REQUEST message includes an E-RAB bearer context (E-RAB configuration information).

In Step S207, the MeNB 1 sends the E-RAB configuration information to the LPN 2 (in this example, selected LPN) via the X2/X3 signaling bearer. The E-RAB configuration information includes S1 bearer configuration information and DRB configuration information. The LPN 2 sets up the S1 bearer and the DRB in accordance with the E-RAB configuration information. The S1 bearer configuration information includes information that is necessary to establish the S1 bearer with the S-GW 7. The S1 bearer configuration information includes, for example, at least one of the E-RAB ID, a Quality Class Indicator (QCI), the IP address of the S-GW 7, the S-GW 7 side TEID of a GTP tunnel (S1 bearer), a security key, and a Temporary Mobile Subscriber Identity (TMSI) allocated to the UE 4. Further, the DRB configuration information includes configuration information that is necessary to establish the DRB with the UE 4. The DRB configuration information includes, for example, the E-RAB ID, a Quality Class Indicator (QCI), and configuration information of the physical layer and the MAC sublayer.

In Step S208, the MeNB 1 transmits, to the UE 4 through the SRB in the cell 10, the DRB configuration information regarding the DRB in the cell 20. The DRB configuration information is transmitted using an RRC Connection Reconfiguration message. The UE 4 sets up the DRB in accordance with the DRB configuration information.

In Step S209, the MeNB 1 sends a message indicating E-RAB setup completion (i.e., INITIAL CONTEXT SETUP RESPONSE message) to the MME 6. This message includes LPN 2 side configuration information regarding the S1 bearer (e.g., the address and the TEID of the selected LPN). In Step S210, the MME 6 and the S-GW 7 modify the EPS bearer context based on the INITIAL CONTEXT SETUP RESPONSE message. That is, the MME 6 sends to the S-GW 7 a message (i.e., MODIFY BEARER REQUEST message) containing the TEID and the address of the selected LPN. The S-GW 7 updates the S1 bearer configuration with the TEID and the address of the LPN 2 received from the MME 6.

According to the above processing of Steps S202 to S210, the E-RAB that passes through the LPN 2 has been configured between the UE 4 and the S-GW 7. In Step S211, the UE 4 receives or transmits user data via the cell 20 and the LPN 2.

Figure 11:
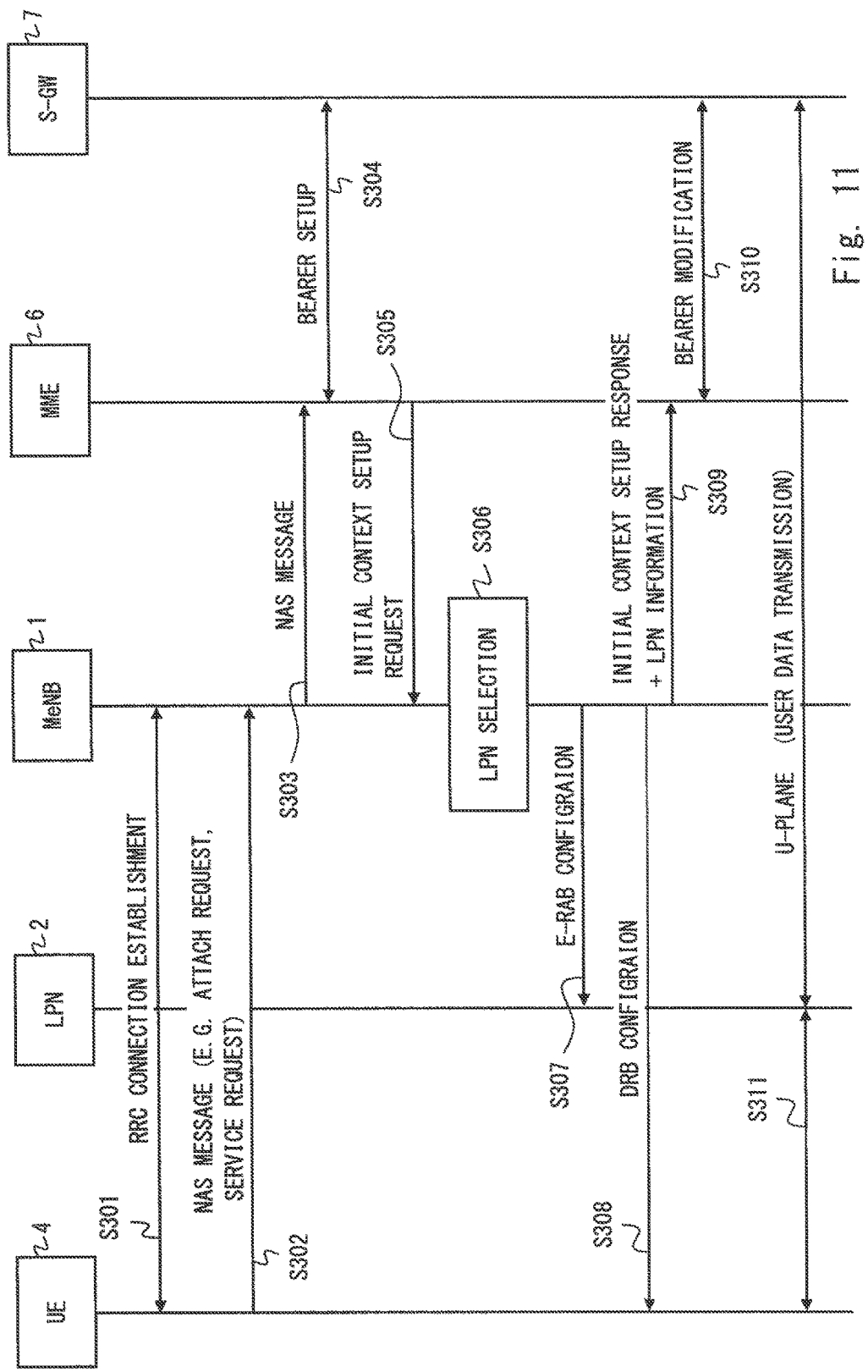
FIG. 11 is a sequence diagram showing another example of the communication control method according to the first embodiment.

Next, a modified example of the U-Plane bearer establishment procedure will be described. FIG. 11 is a sequence diagram showing a second example of the procedure for establishing the U-Plane bearer in the SCell. In the example shown in FIG. 11, the MeNB 1 receives, after forwarding the NAS message (Step S303) to the MME 6, the bearer context regarding the S1 bearer from the MME 6 (Step S305), sends the bearer context to the selected LPN (Step S307), and then sends the LPN information to the MME 6 after the S1 bearer has been configured in the selected LPN (Step S309). Specifically, the MeNB 1 includes the LPN information into the S1-AP: INITIAL CONTEXT SETUP COMPLETE MESSAGE" that is used to notify the MME 6 of the completion of the bearer setup.

The processing in Steps S301 and S302 in FIG. 11 is similar to the processing in Steps S201 and S202 shown in FIG. 10. In Step S303, the MeNB 1 forwards, to the MME 6, the NAS message received from the UE 4. In Step S304, the MME 6 and the S-GW 7 perform an EPS bearer setup procedure. In Step S305, the MME 6 sends the INITIAL CONTEXT SETUP REQUEST message to the MeNB 1. The INITIAL CONTEXT SETUP REQUEST message contains the E-RAB bearer context (E-RAB configuration information).

In Step S306, the MeNB 1 determines the selected LPN from at least one LPN 2. In one example, the MeNB 1 may receive the LPN measurement information from the UE 4 and determine the LPN 2 of high reception quality at the UE 4 as the selected LPN. In Step S307, the MeNB 1 sends the E-RAB configuration information to the selected LPN via the X2/X3 signaling bearer. In Step S308, the MeNB 1 transmits, to the UE 4 through the SRB in the cell 10, the DRB configuration information regarding the DRB in the cell 20. The processing in Steps S307 and S308 is similar to the processing in Steps S207 and S208 in FIG. 10.

In Step S309, the MeNB 1 sends a message indicating the E-RAB setup completion (i.e., INITIAL CONTEXT SETUP RESPONSE message) to the MME 6. This INITIAL CONTEXT SETUP RESPONSE message includes the LPN information indicating the selected LPN. In this case, the LPN information may be LPN 2 side configuration information regarding the S1 bearer (e.g., the address and the TEID of the selected LPN). In Step S310, the MME 6 and the S-GW 7 modify the EPS bearer context based on the INITIAL CONTEXT SETUP RESPONSE message. That is, the MME 6 sends a message (i.e., MODIFY BEARER REQUEST message) containing the address and the TEID of the selected LPN to the S-GW 7. The S-GW 7 updates the S1 bearer configuration with the address and the TEID of the LPN 2 received from the MME 6.

According to the above processing of Steps S302 to S310, the E-RAB that passes through the LPN 2 has been configured between the UE 4 and the S-GW 7. In Step S311, the UE 4 receives or transmits user data via the cell 20 and the LPN 2.

Note that, in Step S203 shown in FIG. 10 and Step S306 shown in FIG. 11, the MeNB 1 may select the MeNB 1 itself when there is no appropriate LPN 2. In one example, the MeNB 1 may configure the U-Plane bearer for the UE 4 in the cell 10 of the MeNB 1 when any LPN reception quality measured by the UE 4 is below a reference value.

Second Embodiment

In this embodiment, a specific example of the procedure for determining the selected LPN using the LPN measurement information from the UE 4 will be described. A configuration example of a radio communication system according to this embodiment is similar to that shown in FIG. 1. The MeNB 1 according to this embodiment receives an RRC message containing an initial NAS message (e.g., Attach Request, Service Request, or TAU Request) from the UE 4 and receives, before forwarding this NAS message to the MME 6, the LPN measurement information from the UE 4. The MeNB 1 determines the selected LPN based on the LPN measurement information and forwards the NAS message to the MME 6 together with the LPN information indicating the selected LPN. Accordingly, the U-Plane bearer establishment procedure according to this embodiment is similar to that of the first example shown in FIG. 10.

The MeNB 1 may use the RRC connection (SRB1) to instruct the UE 4 to send the LPN measurement information. Further, the MeNB 1 may instruct the UE 4 to measure a downlink signal from the LPN 2. The MeMB 1 may notify the UE 4 of at least one LPN 2 to be measured. In one example, while performing the RRC connection establishment procedure including the contention-based random access procedure, the MeNB 1 may instruct the UE 4 to measure the LPN 2. Specifically, the MeNB 1 may transmit to the UE 4 the measurement configuration using an RRC Connection Setup message (i.e., the fourth-step message in the random access procedure). The measurement configuration includes a list of second cells 20 that should be measured by the UE 4. In another example, the MeNB 1 may transmit the measurement configuration to the UE 4 using an RRC message (e.g., RRC Connection Reconfiguration) after the establishment of the RRC connection has been completed.

Further, the UE 4 may measure the downlink signal of the LPN 2 in advance during an idle mode (i.e., when the SRB and the DRB have not yet been established) and transmit the LPN measurement information to the MeNB 1 using an RRC message (e.g., UE Information Response) after the RRC connection has been established. In this case, the measurement by the UE 4 in the idle mode may be performed in accordance with a Logged Minimization of Drive Tests (MDT). The Logged MDT is defined in 3GPP TR 36.805 and 3GPP TS 37.320.

Figure 12:
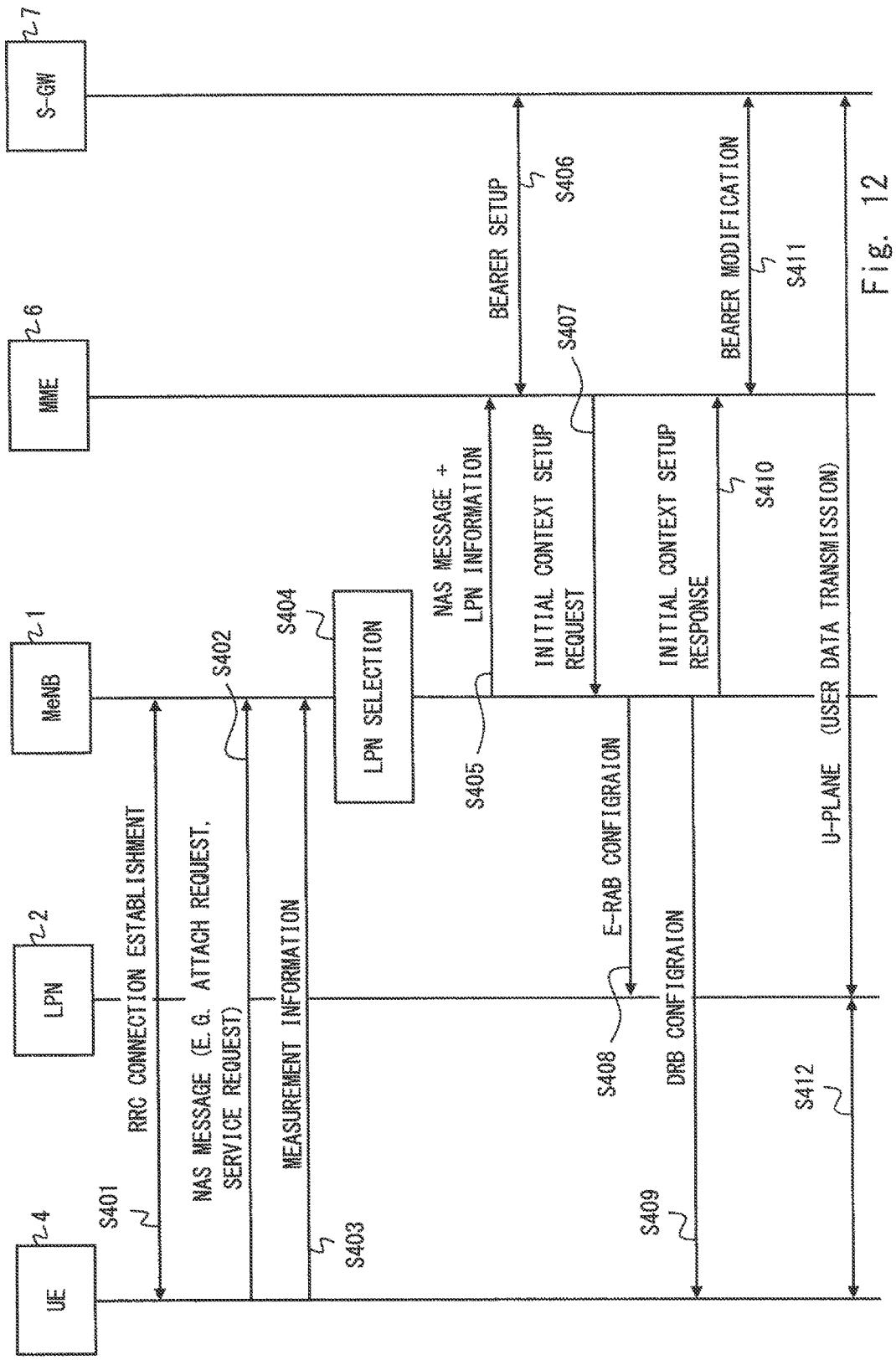
FIG. 12 is a sequence diagram showing one example of a communication control method according to a second embodiment.

FIG. 12 is a sequence diagram showing a specific example of the U-Plane bearer establishment procedure according to this embodiment. The processing in Steps S401 and S402 is similar to the processing in Steps S201 and S202 shown in FIG. 10. In Step S403, the UE 4 transmits the LPN measurement information to the MeNB 1. In Step S404, the MeNB 1 determines the selected LPN based on the LPN measurement information. The processing in Steps S405 to S412 is similar to the processing in Steps S204 to S211 shown in FIG. 10.

Figure 13:
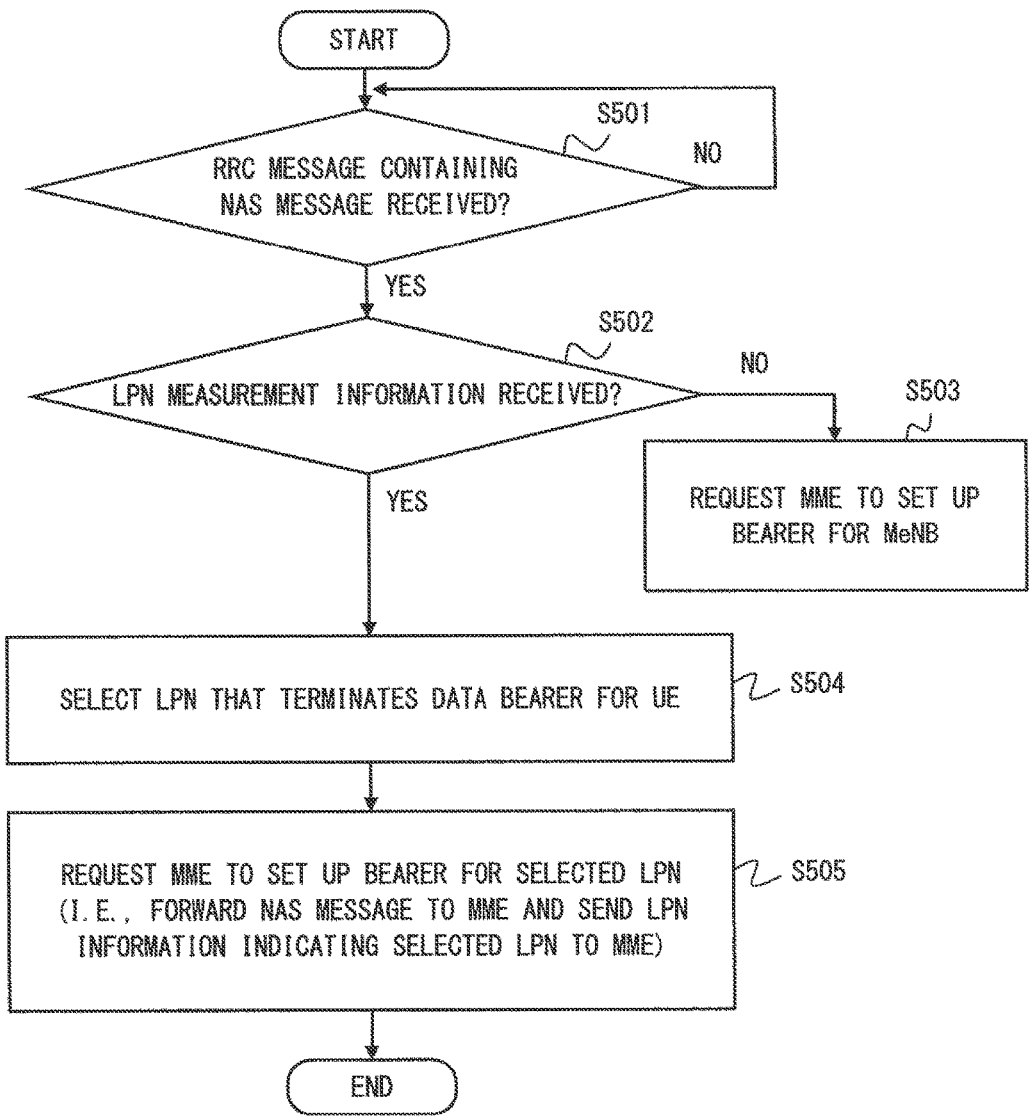
FIG. 13 is a flowchart showing an operation example of a first base station (e.g., MeNB) according to the second embodiment.

FIG. 13 is a flowchart showing an operation example of the MeNB 1 according to this embodiment. In Step S501, the MeNB 1 (controller 15) receives an RRC message containing an initial NAS message (e.g., Attach Request, Service Request, or TAU Request) from the UE 4, which supports the dual connectivity. The initial NAS message is a message that causes a setup of the U-Plane bearer. In Step S502, the MeNB 1 determines whether the LPN measurement information has been received from the UE 4. When the LPN measurement information has not been received (NO in Step S502), the MeNB 1 requests the MME 6 to set up the U-Plane bearer that passes through the MeNB 1. That is, the MeNB 1 forwards the NAS message to the MME 6 and establishes an E-RAB containing a DRB in the cell 10.

Meanwhile, when the LPN measurement information has been received (YES in Step S502), the MeNB 1 determines the selected LPN that sets up the U-Plane bearer for the UE 4 or terminates the DRB and the S1 bearer (Step S504). In Step S505, the MeNB 1 requests the MME 6 to set up a bearer regarding the selected LPN. Specifically, the MeNB 1 forwards the NAS message to the MME 6 and also sends the LPN information indicating the selected LPN to the MME 6.

Figure 14:
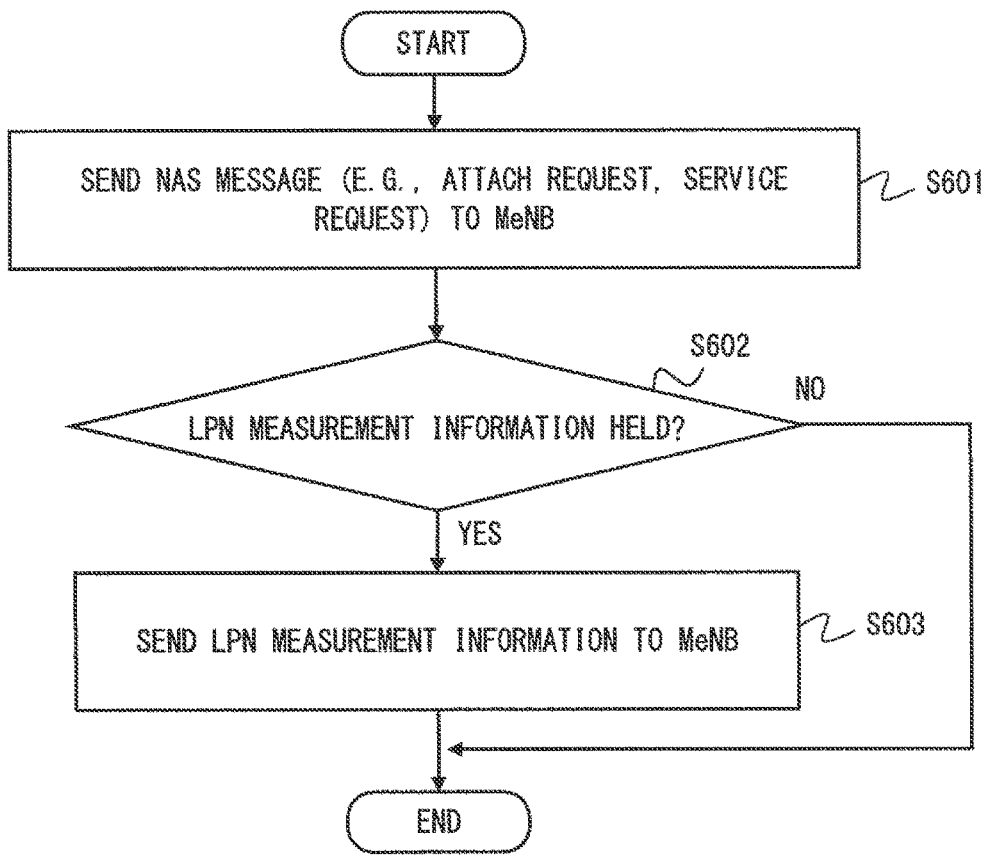
FIG. 14 is a flowchart showing an operation example of a mobile station (e.g., UE) according to the second embodiment.

FIG. 14 is a flowchart showing an operation example of the UE 4 according to this embodiment. In Step S601, the UE 4 (controller 45) sends to the MeNB the initial NAS message, which causes a setup of the U-Plane bearer, using an RRC message. In Steps S602 and S603, the UE 4 sends the LPN measurement information to the MeNB 1 when the UE 4 has held the LPN measurement information. The UE 4 may measure downlink signals from LPNs 2 in response to the instruction from the MeNB 1. The UE 4 may send to the MeNB 1, as the LPN measurement information, a measurement log that has been obtained in advance during the idle mode.

In this embodiment, the MeNB 1 receives the LPN information prior to the forwarding of the NAS message to the MME 6. Accordingly, the MeNB 1 can determine an appropriate selected LPN before forwarding the NAS message to the MME 6. Further, when forwarding the NAS message to the MME 6, the MeNB 1 can notify the MME 6 of the selected LPN.

Third Embodiment

Figure 15:
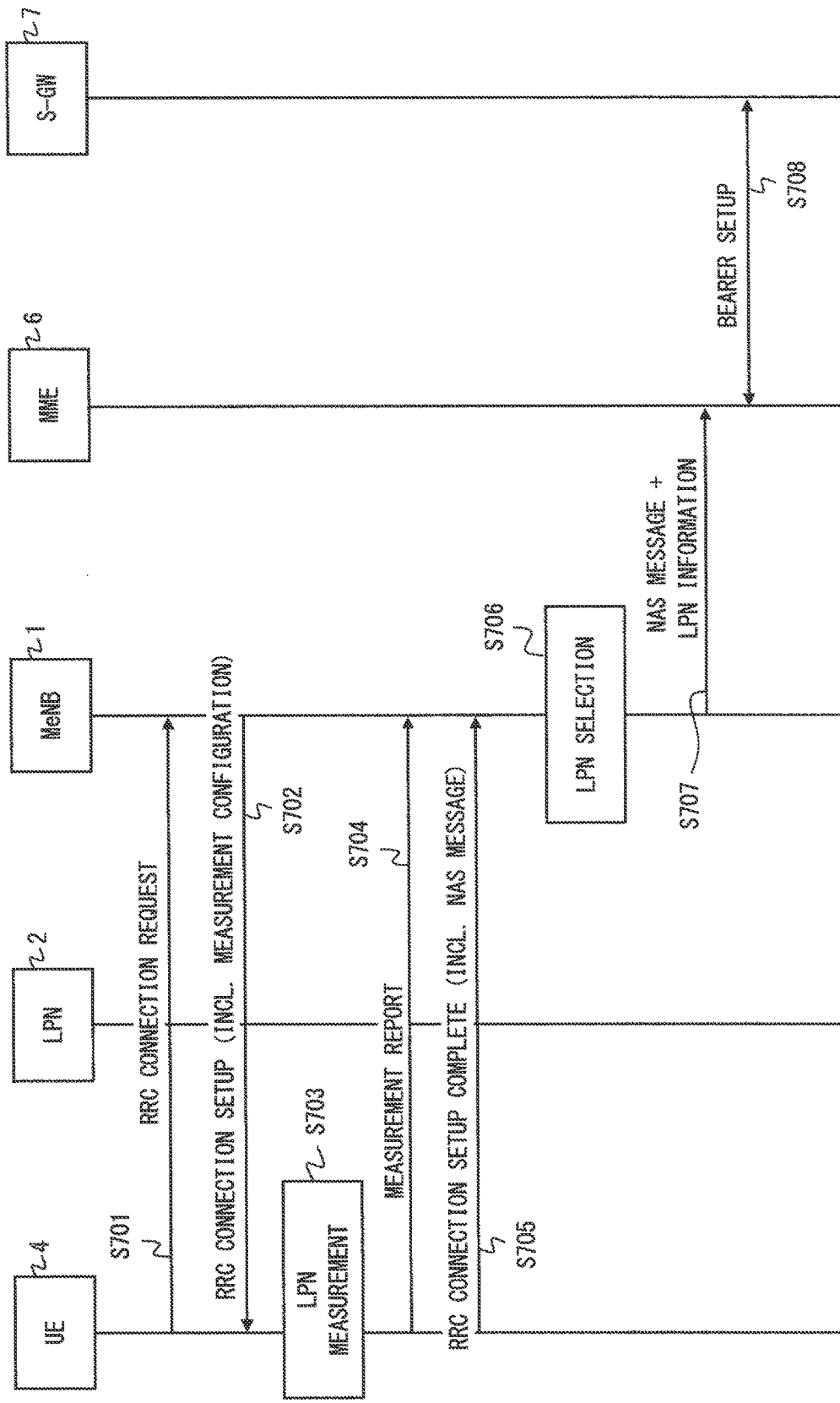
FIG. 15 is a sequence diagram showing one example of a communication control method according to a third embodiment.

In this embodiment, a specific example of the transmission of the LPN measurement information to the MeNB 1 from the UE 4 described in the second embodiment will be described. A configuration example of a radio communication system according to this embodiment is similar to that shown in FIG. 1. The MeNB 1 according to this embodiment instructs, before forwarding the initial NAS message to the MME 6, the UE 4 to measure the LPN 2. FIG. 15 is a sequence diagram showing a specific example of a U-Plane bearer establishment procedure according to this embodiment. In the example shown in FIG. 15, a measurement on LPNs 2 is performed during the RRC connection establishment procedure. In Step S701, the UE 4 transmits an RRC Connection Request message (i.e., the third-step message in the random access procedure) to the MeNB 1. In Step S702, the MeNB 1 transmits an RRC Connection Setup message (i.e., the fourth-step message in the random access procedure). The RRC Connection Setup message transmitted in Step S702 includes both the initial configuration of the SRB (SRB1) and the LPN measurement configuration. In Step S703, the UE 4 measures downlink signals from at least one LPN 2 specified by the LPN measurement configuration. In Step S704, the UE 4 transmits the LPN measurement information to the MeNB 1 using a Measurement Report message. In Step S705, the UE 4 transmits an RRC Connection Setup Complete message containing the initial NAS message to the MeNB 1. The transmission of the LPN measurement information (Step S704) may be performed after the transmission of the RRC Connection Setup Complete message (Step S705). The processing in Steps S706 to S708 in FIG. 15 is similar to the processing in Steps S404 to S406 in FIG. 12. Further, while the description is omitted in FIG. 15, the radio communication system according to this embodiment may perform the similar processing as Steps S407 to S412 in FIG. 12 after performing the processing in Step S708.

In this embodiment, the MeNB 1 can instruct the UE 4 to measure the LPN 2 and receive the LPN measurement information from the UE 4 during the RRC connection establishment procedure.

Fourth Embodiment

Figure 16:
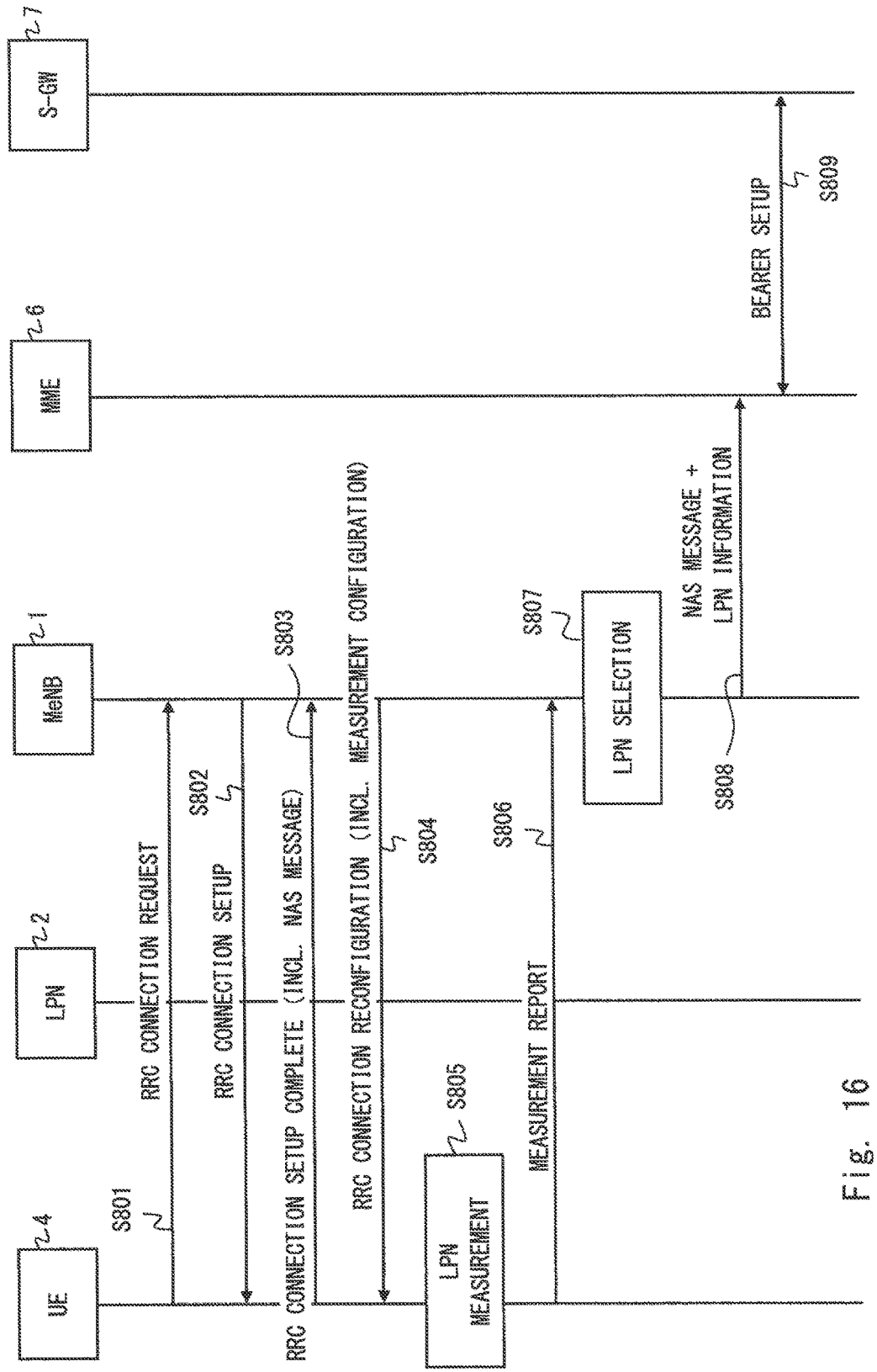
FIG. 16 is a sequence diagram showing one example of a communication control method according to a fourth embodiment.

This embodiment shows another specific example of the transmission of the LPN measurement information to the MeNB 1 from the UE 4 described in the second embodiment. A configuration example of a radio communication system according to this embodiment is similar to that in FIG. 1. The MeNB 1 according to this embodiment instructs the UE 4 to measure the LPN 2 after the RRC connection has been established. FIG. 16 is a sequence diagram showing a specific example of a U-Plane bearer establishment procedure according to this embodiment. Steps S801 to S803 show the normal RRC connection establishment procedure in the LTE. That is, the UE 4 transmits an RRC Connection Request message to the MeNB 1 (Step S801), the MeNB 1 transmits an RRC Connection Setup message to the UE 4 (Step S802), and the UE 4 transmits an RRC Connection Setup Complete message to the MeNB 1 (Step S803).

In Step S804, the MeNB 1 transmits an RRC Connection Reconfiguration message containing the LPN measurement configuration to the UE 4. That is, the MeNB 1 instructs the UE 4 to measure the LPN 2 using the RRC Connection Reconfiguration message. In Step S805, the UE 4 measures downlink signals from at least one LPN 2 specified in the LPN measurement configuration. In Step S806, the UE 4 transmits the LPN measurement information to the MeNB 1 using a Measurement Report message. The processing in Steps S807 to S809 in FIG. 16 is similar to the processing in Steps S404 to S406 in FIG. 12. Further, while the description is omitted in FIG. 15, the radio communication system according to this embodiment may perform the processing similar to Steps S407 to S412 in FIG. 12 after performing the processing of Step S809.

In this embodiment, the MeNB 1 can instruct, after the RRC connection has been established, the UE 4 to measure the LPN 2 and can receive the LPN measurement information from the UE 4.

Fifth Embodiment

This embodiment shows still another specific example of the transmission of the LPN measurement information to the MeNB 1 from the UE 4 described in the second embodiment. A configuration example of a radio communication system according to this embodiment is similar to that shown in FIG. 1. The MeNB 1 according to this embodiment uses, as the LPN measurement information, a measurement log collected by the UE 4 which is in the idle mode in accordance with the Logged MDT. When establishing an RRC connection with the MeNB 1 in order to send an initial NAS message, the UE 4 transmits to the MeNB 1 the measurement log collected in accordance with the Logged MDT.

Figure 17:
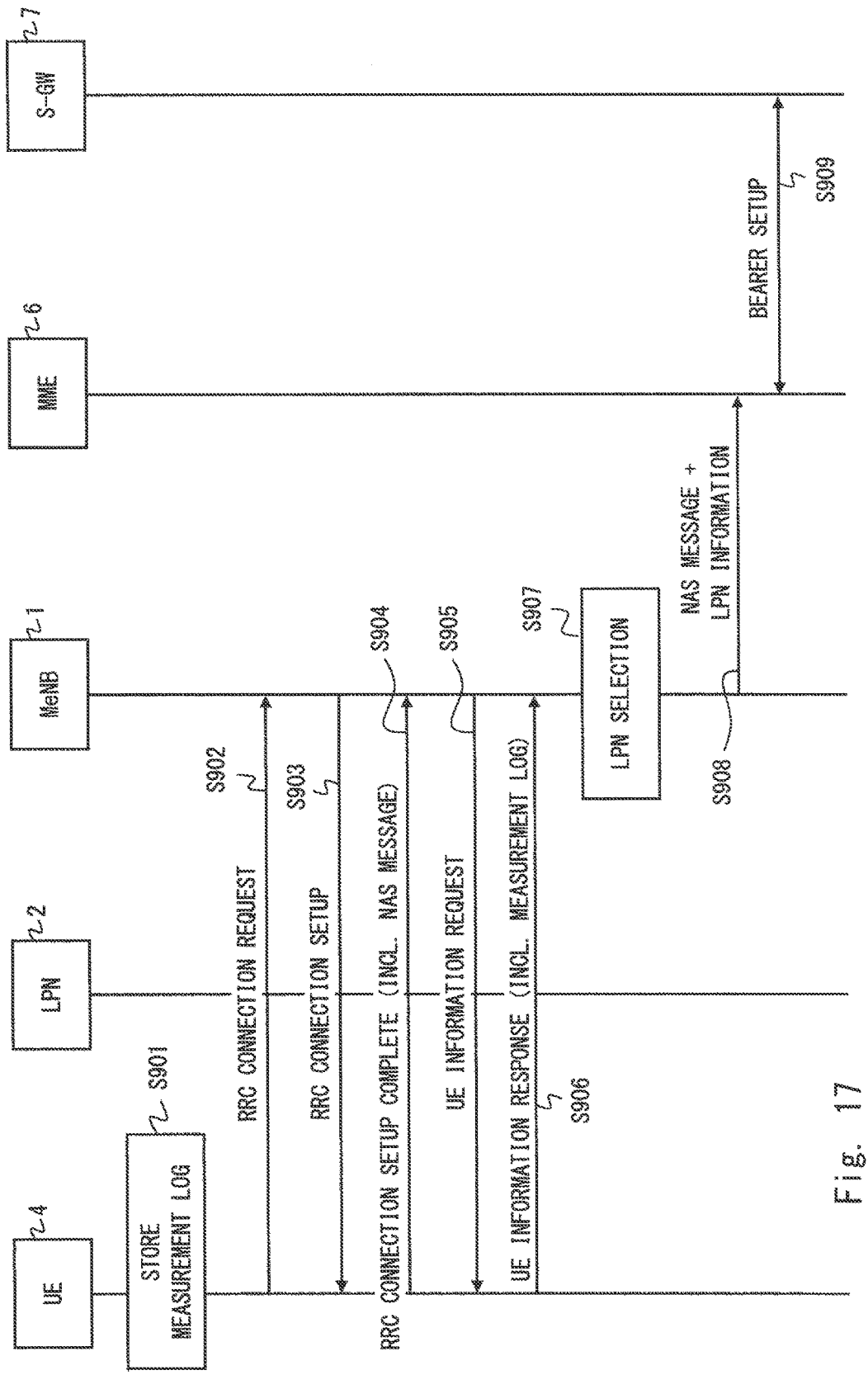
FIG. 17 is a sequence diagram showing one example of a communication control method according to a fifth embodiment.

FIG. 17 is a sequence diagram showing a specific example of a U-Plane bearer establishment procedure according to this embodiment. In Step S901, the UE 4 collects the measurement log during the idle mode. In Steps S902 to S904, the UE 4 and the MeNB 1 establish an RRC connection and transfer an initial NAS message. The RRC Connection Setup Complete message transmitted in Step S904 may include flag information indicating whether the UE 4 has the measurement log based on the Logged MDT. As a result of this, the MeNB 1 can easily determine whether to request the UE 4 to report the measurement log.

In Step S905, the MeNB 1 instructs the UE 4 to transmit the measurement log or the LPN information using the UE Information Request message. In Step S906, the UE 4 transmits the measurement log (LPN information) to the MeNB 1 using the UE Information Response message. The processing in Steps S907 to S909 in FIG. 17 is similar to the processing in Steps 404 to S406 in FIG. 12. Further, although not shown in FIG. 15, the radio communication system according to this embodiment may perform processing similar to that shown in Steps S407 to S412 in FIG. 12 after performing the processing of Step S909.

Figure 18:
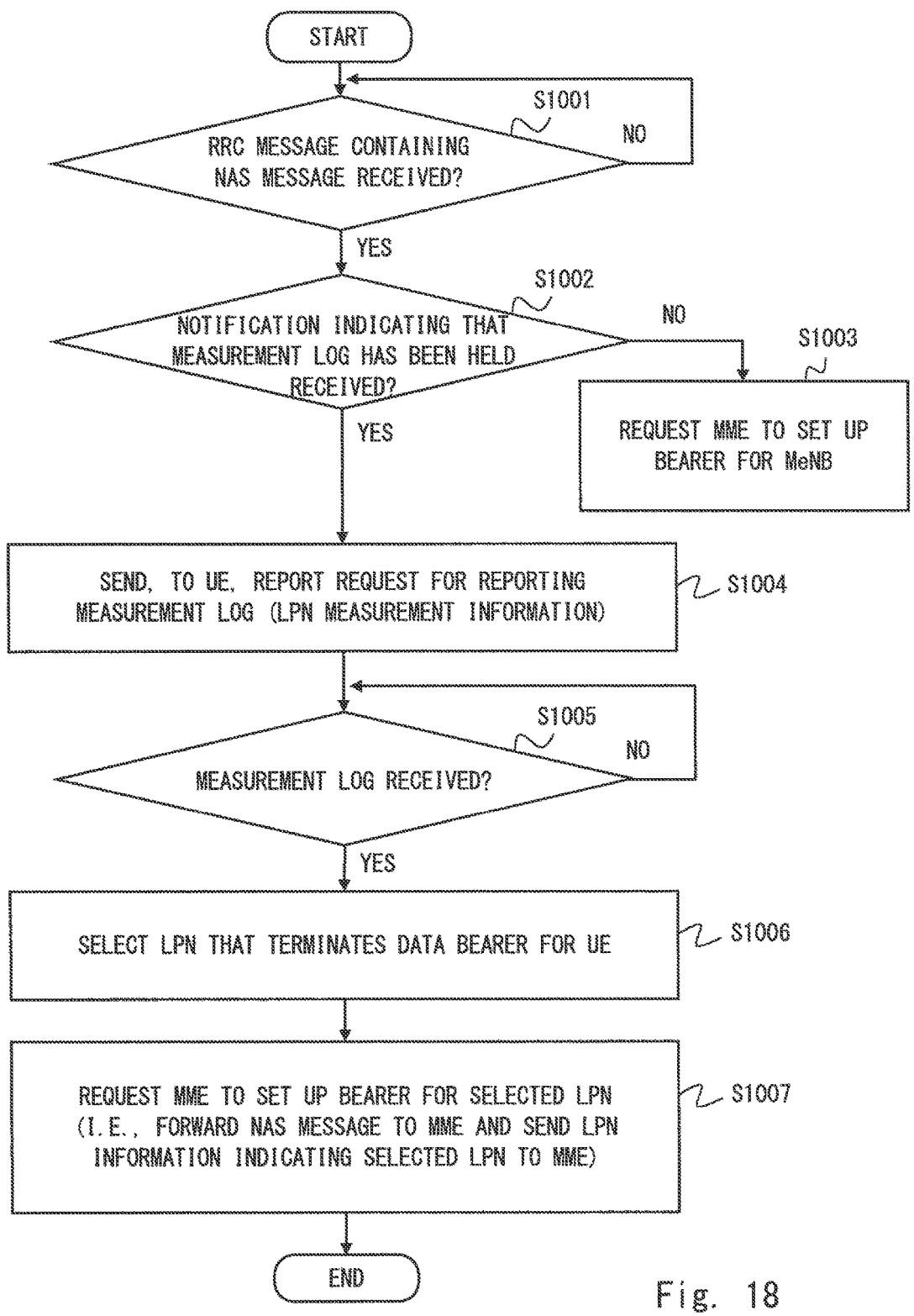
FIG. 18 is a flowchart showing an operation example of a first base station (e.g., MeNB) according to the fifth embodiment.

FIG. 18 is a flowchart showing an operation example of the MeNB 1 according to this embodiment. In Step S1001, the MeNB 1 (controller 15) receives an RRC message containing an initial NAS message (e.g., Attach Request, Service Request, or TAU Request) from the UE 4, which supports the dual connectivity. The initial NAS message is a message that causes a setup of the U-Plane bearer. In Step S1002, the MeNB 1 determines whether the MeNB 1 has received from the UE 4 a notification indicating that the measurement log has been held in the UE 4. When the notification has not been received (NO in Step S1002), the MeNB 1 requests the MME 6 to set up the U-Plane bearer that passes through the MeNB 1. That is, the MeNB 1 forwards the NAS message to the MME 6 and establishes an E-RAB containing a DRB in the cell 10.

Meanwhile, when the notification indicating that the measurement log has been held in the UE 4 has been received (YES in Step S1002), the MeNB 1 transmits to the UE 4 a request for reporting of the measurement log (i.e., the LPN measurement information) (Step S1004). In Steps S1005 and S1006, the MeNB 1 receives the measurement log and determines the selected LPN that terminates the S1 bearer and the DRB for the UE 4. In Step S1007, the MeNB 1 requests the MME 6 to set up a bearer regarding the selected LPN. Specifically, the MeNB 1 forwards the NAS message to the MME 6 and also sends the LPN information indicating the selected LPN to the MME 6.

Figure 19:
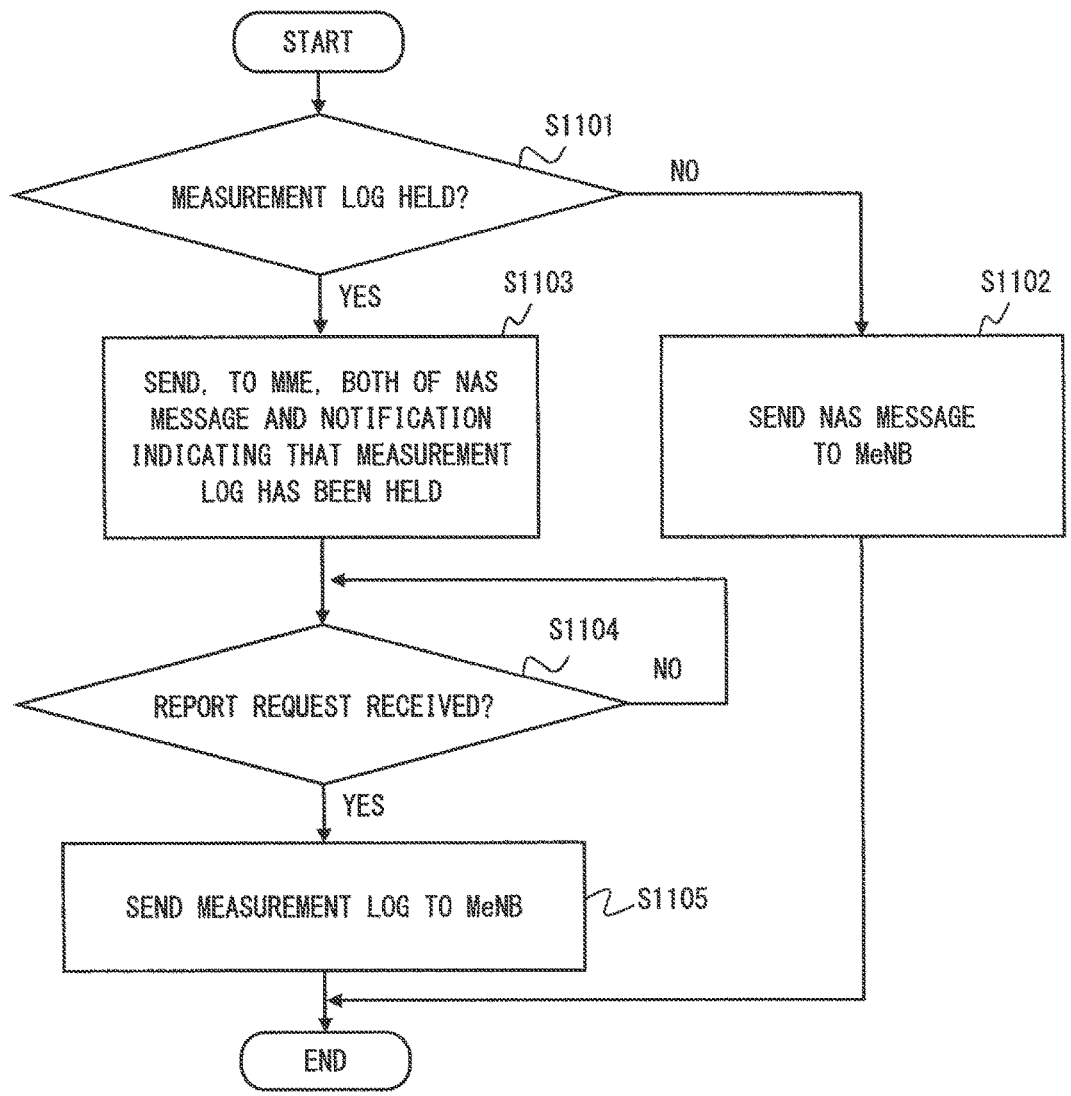
FIG. 19 is a flowchart showing an operation example of a mobile station (e.g., UE) according to the fifth embodiment.

FIG. 19 is a flowchart showing an operation example of the UE 4 according to this embodiment. In Step S1101, the UE 4 (controller 45) determines whether the UE 4 has held the measurement log indicating results of measurements on LPNs 2 performed during the idle mode. When the UE 4 has not held the measurement log (YES in Step S1101), the UE 4 transmits only the normal initial NAS message to the MeNB 1 (Step S1102). On the other hand, when the UE 4 has held the measurement log (YES in Step S1101), the UE 4 transmits, to the MeNB 1, not only the initial NAS message but also a notification indicating that the UE 4 has held the measurement log (Step S1103). In Steps S1104 and S1105, the UE 4 receives, from the MeNB 1, a request for reporting of the measurement log (i.e., the LPN measurement information) and transmits the measurement log to the MeNB 1.

In this embodiment, the MeNB 1 can determine the selected LPN using the LPN measurement information obtained in advance by the UE 4 during the idle mode. Accordingly, there is no need to wait for the measurement on LPNs 2 by the UE 4, and whereby it is possible to quickly determine the selected LPN and establish the U-Plane bearer.

Sixth Embodiment

This embodiment shows a specific example of the procedure for determining the selected LPN using the LPN measurement information from the UE 4. A configuration example of a radio communication system according to this embodiment is similar to that shown in FIG. 1. The MeNB 1 according to this embodiment forwards an initial NAS message (e.g., Attach Request, Service Request or TAU Request) received from the UE 4 to the MME 6, receives a bearer context regarding an S1 bearer from the MME 6, and then receives the LPN measurement information from the UE 4. After that, the MeNB 1 determines the selected LPN based on the LPN measurement information, and sends the LPN Information to the MME 6 after the setup of the S1 bearer in the selected LPN has been completed. Therefore, the procedure for establishing the U-Plane bearer according to this embodiment is similar to that in the second example shown in FIG. 11.

Figure 20:
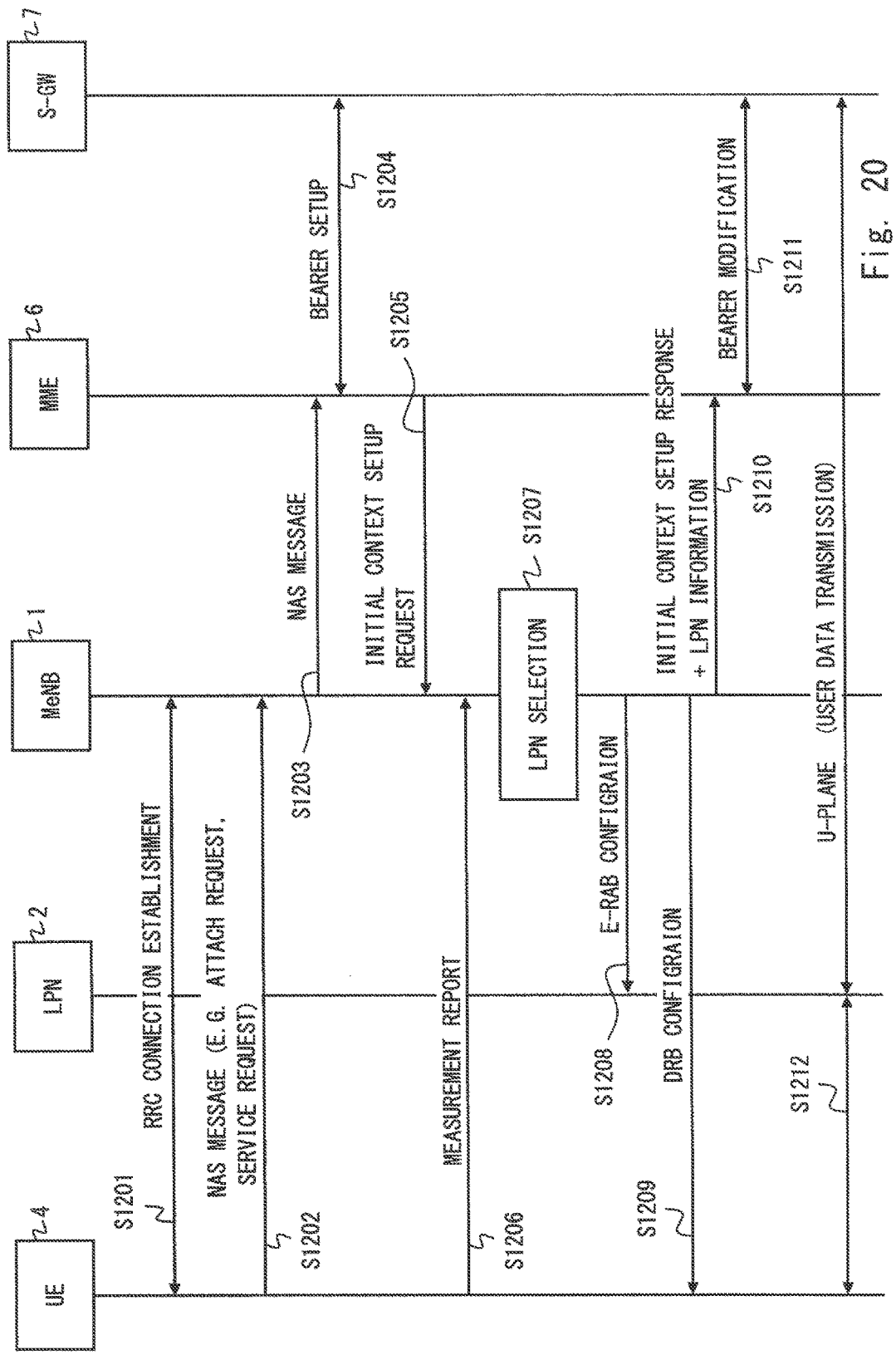
FIG. 20 is a sequence diagram showing one example of a communication control method according to a sixth embodiment.

FIG. 20 is a sequence diagram showing a specific example of a U-Plane bearer establishment procedure according to this embodiment. The processing in Steps S1201 to S1205 is similar to the processing in Steps S301 to S305 in FIG. 11. In Step S1206, the UE 4 transmits the LPN measurement information to the MeNB 1 using a Measurement Report message. In Step S1207, the MeNB 1 determines the selected LPN based on the LPN measurement information. The processing in Steps S1208 to S1212 is similar to the processing in Steps S307 to S311 in FIG. 11.

Seventh Embodiment

This embodiment shows first to third examples of the procedure for detecting a UE that supports the dual connectivity. The procedure for detecting a UE that supports the dual connectivity described in this embodiment can be combined with any of the first to sixth embodiments stated above. A configuration example of a radio communication system according to this embodiment is similar to that in FIG. 1.
(First Detection Procedure)

Figure 21:
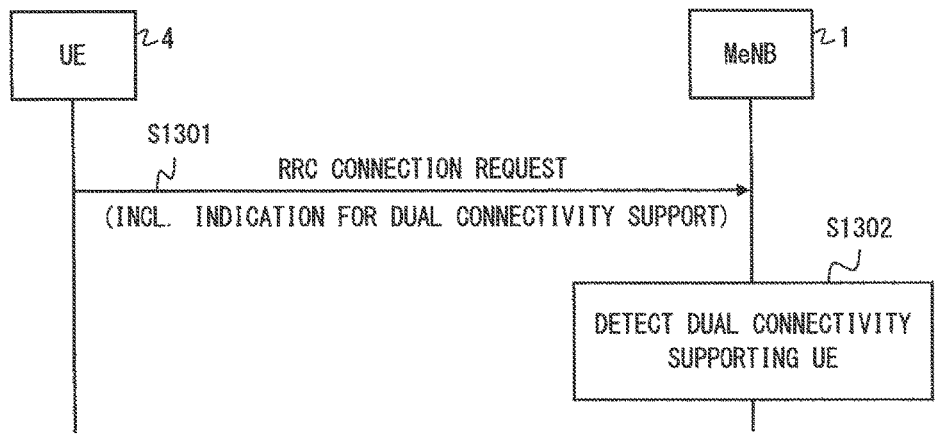
FIG. 21 is a sequence diagram showing one example of a communication control method according to a seventh embodiment.

FIG. 21 is a sequence diagram showing the first detection procedure. In the first detection procedure, the UE 4 sends dual-connectivity support information to the MeNB 1 (Step S1301). The UE 4 may notify the MeNB 1 that the UE 4 supports (or does not support) the dual connectivity. The MeNB 1 receives the dual-connectivity support information from the UE 4 and determines whether the UE 4 supports the dual connectivity (Step S1302).

For example, the UE 4 may indicate the support of the dual connectivity using an RRC connection request message or RRC Connection Setup Complete message transmitted during the RRC connection establishment procedure. For example, the UE 4 may indicate the support of the dual connectivity using an establishment cause contained in the RRC connection request message. The UE 4 may indicate the support of the dual connectivity using an attach type or request type contained in an Attach Request message as the initial NAS message.
(Second Detection Procedure)

In the second detection procedure, the MeNB 1 operates a special cell that can be accessed only by dual-connectivity-supporting UEs. The MeNB 1 determines that the UE 4 which has accessed this special cell as a dual-connectivity-supporting UE. In one example, the special cell, which can be accessed only by dual-connectivity-supporting UEs, may be a cell which has an assignment of reference signals (RSs) different from that of a legacy cell that can be accessed by UEs (legacy UEs) that do not support the dual connectivity. Alternatively, the special cell, which can be accessed only by Dual-connectivity-supporting UEs, may be a cell that uses a special frequency band that cannot be used by the legacy UEs.
(Third Detection Procedure)

Figure 22:
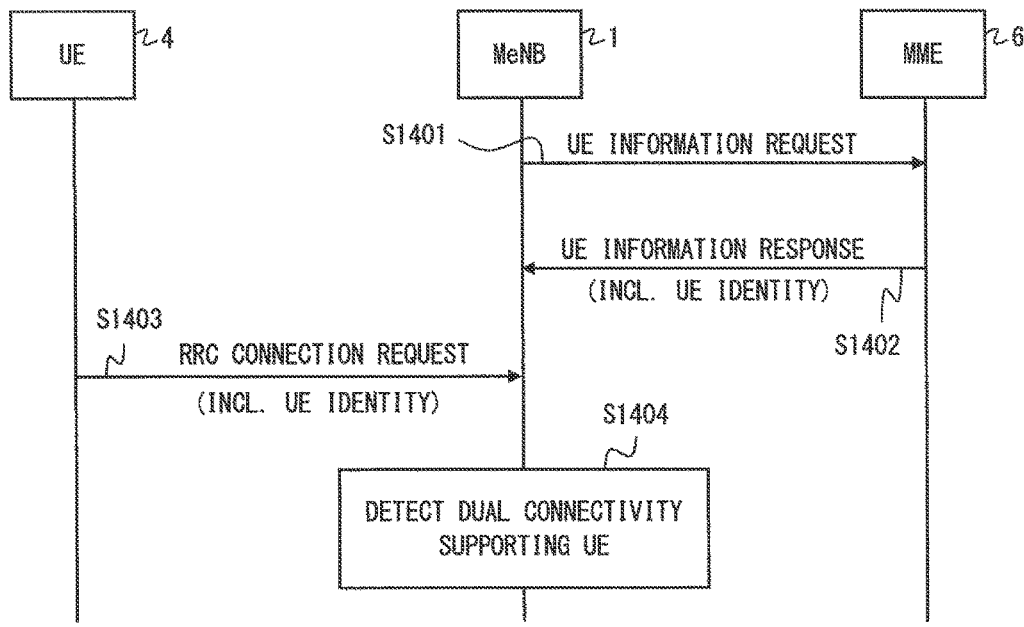
FIG. 22 is a sequence diagram showing another example of the communication control method according to the seventh embodiment.

FIG. 22 is a sequence diagram showing the third detection procedure. In the third detection procedure, the MeNB 1 obtains identification information (e.g., TMSI) of a dual-connectivity-supporting UE (Steps S1401 and S1402). The MeNB 1 receives the identification information of the UE 4 when the UE 4 connects to a network. In the example shown in FIG. 22, the MeNB 1 receives an RRC Connection Request message containing the identification information of the UE 4 (e.g., TMSI) (Step S1403). The MeNB 1 then determines whether the UE 4 is a dual-connectivity-supporting UE or not, according to whether the identification information of the UE 4 coincides with the identification information of dual-connectivity-supporting UEs (Step S1404).

According to this embodiment, the MeNB 1 can determine whether the UE 4 supports the dual connectivity. Accordingly, the MeNB 1 can easily determine whether to set up the U-Plane bearer for the UE 4 to the MeNB 1 or to the LPN 2 according to whether the UE 4 supports the dual connectivity.

Other Embodiments

The above-described first to seventh embodiments may be appropriately combined.

All the communication control methods in the dual-connectivity scenario performed by the MeNB 1, the LPN 2, the UE 4, the MME 6, and the S-GW 7 described in the first to seventh embodiments may be implemented by using a semiconductor processing device including an Application Specific Integrated Circuit (ASIC). Alternatively, these methods may be implemented by causing a computer system including at least one processor (e.g., microprocessor, Micro Processing Unit (MPU), Digital Signal Processor (DSP)) to execute a program. Specifically, one or more programs including instructions to cause a computer system to perform the algorithms shown in the flowcharts and the sequence diagrams may be created and these programs may be supplied to a computer.

These programs can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). These programs may be provided to a computer using any type of transitory computer readable media. Examples of transitory computer readable media include electric signals, optical signals, and electromagnetic waves. Transitory computer readable media can provide a program to a computer via a wired communication line (e.g., electric wires, and optical fibers) or a wireless communication line.

In the above first to seventh embodiments, the LTE system has been mainly described. However, these embodiments may be applied to radio communication systems other than the LTE system, for example, a 3GPP Universal Mobile Telecommunications System (UMTS), a 3GPP2 CDMA2000 system (1×RTT, High Rate Packet Data (HRPD)), a Global System for Mobile Communications (GSM) system, or a WiMAX system.

Further, the above embodiments are merely examples of applications of technical ideas obtained by the present inventors. Needless to say, these technical ideas are not limited to the above embodiments and may be changed in various ways.

This application is based upon and claims the benefit of priority from Japanese Patent Application No. 2013-004434, filed on Jan. 15, 2013, the disclosure of which is incorporated herein in its entirety by reference.

REFERENCE SIGNS LIST

1 BASE STATION (MeNB)
2 BASE STATION (LPN)
4 MOBILE STATION (UE)
5 CORE NETWORK (EPC)
6 MOBILITY MANAGEMENT APPARATUS (MME)
7 DATA TRANSFER APPARATUS (S-GW)
15 CONTROLLER
25 CONTROLLER
45 CONTROLLER
62 BEARER SETUP CONTROLLER
75 BEARER CONTROLLER
80 TUNNEL

The invention claimed is:

1. A radio communication system comprising:
a first base station that operates a first cell;
at least one second base station, each of which operates a second cell;
a core network including a mobility management apparatus and a data transfer apparatus; and
a mobile station having a capability to establish a data radio bearer in the second cell when the mobile station has established a signaling radio bearer in the first cell, wherein the first base station is configured to:
receive, from the mobile station through the signaling radio bearer, a signal containing a Non-Access Stratum (NAS) message that causes a setup of a data bearer in the data transfer apparatus;
forward the NAS message to the mobility management apparatus;
receive, after forwarding the NAS message to the mobility management apparatus, a bearer context regarding the data bearer from the mobility management apparatus;
send the bearer context to a selected base station having been selected from the at least one second base station to set up the data bearer between the data transfer apparatus and the selected base station; and
send, after the data bearer has been configured in the selected base station, base station information indicating the selected base station to the mobility management apparatus.

2. The radio communication system according to claim 1, wherein the first base station is configured to receive, from the mobile station, measurement information regarding the at least one second base station.

3. The radio communication system according to claim 2, wherein the mobile station is configured to transmit the measurement information to the first base station before the first base station forwards the NAS message to the mobility management apparatus.

4. The radio communication system according to claim 2, wherein the first base station is configured to instruct the mobile station to obtain the measurement information.

5. The radio communication system according to claim 2, wherein the first base station is configured to, upon receiving from the mobile station the signal containing the NAS message, instruct the mobile station to obtain the measurement information.

6. The radio communication system according to claim 2, wherein the first base station is configured to, while performing a procedure for establishing the signaling radio bearer with the mobile station, instruct the mobile station to obtain the measurement information.

7. The radio communication system according to claim 2, wherein the first base station is configured to, after establishing the signaling radio bearer with the mobile station, instruct the mobile station to obtain the measurement information.

8. The radio communication system according to claim 2, wherein the first base station is configured to instruct the mobile station to notify the first base station of the measurement information.

9. The radio communication system according to claim 8, wherein the mobile station is configured to, when transmitting the NAS message, notify the first base station whether the mobile station has held the measurement information.

10. The radio communication system according to claim 8, wherein the mobile station is configured to obtain the measurement information in advance when the signaling radio bearer and the data radio bearer have not yet been established.

11. The radio communication system according to claim 2, wherein the first base station is configured to select the selected base station from the at least one second base station.

12. The radio communication system according to claim 1, wherein the first base station is configured to, before sending the bearer context to the selected base station, instruct the mobile station to notify the first base station of measurement information regarding the at least one second base station.

13. The radio communication system according to claim 1, wherein the first base station is configured to receive measurement information regarding the at least one second base station and to select the selected base station from the at least one second base station.

14. The radio communication system according to claim 1, wherein the mobility management apparatus is configured to receive the base station information from the first base station and request the data transfer apparatus to set up the data bearer with the selected base station.

15. The radio communication system according to claim 1, wherein the first base station determines whether the mobile station has the capability.

16. The radio communication system according to claim 15, wherein the mobile station is configured to transmit, to the first base station, attribute information indicating the presence or absence of the capability.

17. The radio communication system according to claim 15, wherein
the first cell is a cell to which only a mobile station having the capability can belong, and
the first base station is configured to determine that the mobile station has the capability based on an access by the mobile station to the first cell.

18. A first base station comprising:
a radio communication unit configured to operate a first cell; and
a controller, wherein the controller is configured to:
receive, from a mobile station through a signaling radio bearer in the first cell, a signal containing a Non-Access Stratum (NAS) message that causes a setup of a data bearer in a data transfer apparatus within a core network;
forward the NAS message to a mobility management apparatus within the core network;
receive, after forwarding the NAS message to the mobility management apparatus, a bearer context regarding the data bearer from the mobility management apparatus;
send the bearer context to a selected base station having been selected from at least one second base station to set up the data bearer between the data transfer apparatus and the selected base station; and
send, after the data bearer has been configured in the selected base station, base station information indicating the selected base station to the mobility management apparatus.

19. The first base station according to claim 18, wherein the controller is configured to receive, from the mobile station, measurement information regarding the at least one second base station.

20. The first base station according to claim 19, wherein the controller is configured to receive, before forwarding the NAS message to the mobility management apparatus, the measurement information from the mobile station.

21. The first base station according to claim 19, wherein the controller is configured to, upon receiving from the mobile station the signal containing the NAS message, instruct the mobile station to obtain the measurement information.

22. The first base station according to claim 19, wherein the controller is configured to, while performing a procedure for establishing the signaling radio bearer with the mobile station, instruct the mobile station to obtain the measurement information.

23. The first base station according to claim 19, wherein, the controller is configured to, after establishing the signaling radio bearer with the mobile station, instruct the mobile station to obtain the measurement information.

24. The first base station according to claim 19, wherein the controller is configured to instruct the mobile station to notify the first base station of the measurement information.

25. The first base station according to claim 19, wherein the controller is configured to select the selected base station from the at least one second base station.

26. The first base station according to claim 18, wherein the controller is configured to, before sending the bearer context to the selected base station, instruct the mobile station to notify the first base station of measurement information regarding the at least one second base station.

27. The first base station according to claim 18, wherein the controller is configured to determine whether the mobile station has a capability to establish, when the mobile station has established the signaling radio bearer in the first cell, a data radio bearer in a second cell of the selected base station.

28. The first base station according to claim 27, wherein the controller is configured to receive, from the mobile station, attribute information indicating the presence or absence of the capability.

29. The first base station according to claim 27, wherein
the first cell is a cell to which only a mobile station having the capability can belong, and
the controller is configured to determine that the mobile station has the capability based on an access by the mobile station to the first cell.

30. A communication control method in a first base station that operates a first cell, the communication control method comprising:
receiving, from a mobile station through a signaling radio bearer in the first cell, a signal containing a Non-Access Stratum (NAS) message that causes a setup of a data bearer in a data transfer apparatus within a core network; and
forwarding the NAS message to a mobility management apparatus within the core network;
receiving, after forwarding the NAS message to the mobility management apparatus, a bearer context regarding the data bearer from the mobility management apparatus;
sending the bearer context to a selected base station having been selected from at least one second base station to set up the data bearer between the data transfer apparatus and the selected base station; and
sending, after the data bearer has been configured in the selected base station, base station information indicating the selected base station to the mobility management apparatus.

31. The method according to claim 30, further comprising receiving, before forwarding the NAS message to the mobility management apparatus, measurement information regarding the at least one second base station from the mobile station.

32. The method according to claim 30, further comprising:
receiving measurement information regarding the at least one second base station from the mobile station; and
selecting the selected base station from the at least one second base station.

33. The method according to claim 30, further comprising determining whether the mobile station has a capability to establish, when the mobile station has established the signaling radio bearer in the first cell, a data radio bearer in a second cell of the selected base station.

34. A non-transitory computer readable medium that stores a program for causing a computer to perform a communication control method in a first base station that operates a first cell, wherein the communication control method comprises:

receiving, from a mobile station through a signaling radio bearer in the first cell, a signal containing a Non-Access Stratum (NAS) message that causes a setup of a data bearer in a data transfer apparatus within a core network; and forwarding the NAS message to a mobility management apparatus within the core network;

receiving, after forwarding the NAS message to the mobility management apparatus, a bearer context regarding the data bearer from the mobility management apparatus;

sending the bearer context to a selected base station having been selected from at least one second base station to set up the data bearer between the data transfer apparatus and the selected base station; and sending, after the data bearer has been configured in the selected base station, base station information indicating the selected base station to the mobility management apparatus.

* * * * *